US012750819B2

(12) United States Patent
Bae et al.

(10) Patent No.: US 12,750,819 B2
(45) Date of Patent: Sep. 29, 2026

(54) METHOD OF RECEIVING PAGING MESSAGE, USER EQUIPMENT, PROCESSING DEVICE, STORAGE MEDIUM, METHOD OF TRANSMITTING PAGING MESSAGE, AND BASE STATION

(71) Applicant: LG ELECTRONICS INC., Seoul (KR)

(72) Inventors: Duckhyun Bae, Seoul (KR); Sunghoon Lee, Seoul (KR); Seunghwan Choi, Seoul (KR); Jaehyung Kim, Seoul (KR); Suckchel Yang, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 252 days.

(21) Appl. No.: 18/724,539

(22) PCT Filed: Feb. 16, 2024

(86) PCT No.: PCT/KR2024/095323
§ 371 (c)(1),
(2) Date: Jun. 26, 2024

(87) PCT Pub. No.: WO2024/172609
PCT Pub. Date: Aug. 22, 2024

(65) Prior Publication Data

US 2026/0173033 A1 Jun. 18, 2026

Related U.S. Application Data

(60) Provisional application No. 63/466,345, filed on May 14, 2023, provisional application No. 63/446,340, filed on Feb. 16, 2023.

(30) Foreign Application Priority Data

Apr. 6, 2023 (KR) ........................ 10-2023-0045722
Aug. 10, 2023 (KR) ........................ 10-2023-0105139

(51) Int. Cl.
*H04W 72/231* (2023.01)
*H04L 1/00* (2006.01)
(Continued)

(52) U.S. Cl.
CPC ........... *H04W 68/02* (2013.01); *H04L 1/0061* (2013.01); *H04W 52/0235* (2013.01); *H04W 72/231* (2023.01)

(58) Field of Classification Search
CPC ............... H04W 68/02; H04W 72/231; H04W 52/0235; H04L 1/0061
See application file for complete search history.

(56) References Cited

U.S. PATENT DOCUMENTS 11,690,043 B2 * 6/2023 Wong ................ H04W 52/0229 370/329
12,302,246 B2 * 5/2025 Peng ................ H04W 52/0216
(Continued)

*Primary Examiner* — Syed Ali
(74) *Attorney, Agent, or Firm* — LEE, HONG, DEGERMAN, KANG & WAIMEY

(57) ABSTRACT

The UE receives a wake-up signal (WUS) configuration related to WUS reception, receives an offset value related to a paging occasion (PO), monitors a physical downlink control channel (PDCCH) for a paging radio network temporary identity (P-RNTI) in first type paging PDCCH monitoring occasions (MOs) which are after a WUS MO, based on detection of a WUS in the WUS MO based on the WUS configuration, detects the PDCCH having a cyclic redundancy check (CRC) scrambled with the P-RNTI based on monitoring of the PDCCH, and acquires the paging message based on the PDCCH. The first type paging PDCCH MOs may be respectively determined by WUS MOs based on the WUS configuration and by the offset value.

18 Claims, 14 Drawing Sheets

1

(51) Int. Cl.
*H04W 52/02* (2009.01)
*H04W 68/02* (2009.01)

(56) References Cited

U.S. PATENT DOCUMENTS

| | | | | |
|---|---|---|---|---|
| 12,581,457 | B2 * | 3/2026 | Shi | H04W 68/02 |
| 2022/0159570 | A1 * | 5/2022 | Liu | H04W 68/005 |
| 2023/0209464 | A1 * | 6/2023 | Tsai | H04W 52/0216 370/311 |
| 2023/0276362 | A1 * | 8/2023 | Reial | H04W 56/0015 370/311 |
| 2023/0354198 | A1 * | 11/2023 | Nader | H04W 52/0229 |
| 2023/0397116 | A1 * | 12/2023 | Maleki | H04W 52/0216 |
| 2023/0397167 | A1 * | 12/2023 | Murray | H04W 68/025 |
| 2024/0031985 | A1 * | 1/2024 | Agiwal | H04W 68/02 |
| 2024/0049177 | A1 * | 2/2024 | Shi | H04W 52/0216 |
| 2024/0276450 | A1 * | 8/2024 | Jeong | H04W 52/0229 |
| 2024/0276452 | A1 * | 8/2024 | Selvaganapathy | H04W 68/02 |
| 2025/0008440 | A1 * | 1/2025 | Agiwal | H04W 52/0235 |
| 2025/0016739 | A1 * | 1/2025 | Agiwal | H04W 68/02 |
| 2025/0159655 | A1 * | 5/2025 | Choi | H04W 52/0229 |
| 2026/0019994 | A1 * | 1/2026 | Liu | H04W 52/0235 |

* cited by examiner (a)

(b)

(a) Example of PDSCH time domain resource allocation (b) Example of PUSCH time domain resource allocation

METHOD OF RECEIVING PAGING MESSAGE, USER EQUIPMENT, PROCESSING DEVICE, STORAGE MEDIUM, METHOD OF TRANSMITTING PAGING MESSAGE, AND BASE STATION

CROSS-REFERENCE TO RELATED APPLICATION(S)

This application is the National Stage filing under 35 U.S.C. 371 of International Application No. PCT/KR2024/095323, filed on Feb. 16, 2024, which claims the benefit of earlier filing date and right of priority to Korean Application No(s). 10-2023-0045722, filed on Apr. 6, 2023, 10-2023-0105139, filed on Aug. 10, 2023, and also claims the benefit of U.S. Provisional Application No(s). 63/446,340, filed on Feb. 16, 2023, and 63/466,345, filed on May 14, 2023, the contents of which are all incorporated by reference herein in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

A technical object of the present disclosure is to provide a method and apparatus for reducing power consumption of a UE.

Another technical object of the present disclosure is to provide a paging method and apparatus for a UE using low power (LP).

Another technical object of the present disclosure is to provide a method and apparatus for determining a paging occasion for a UE using LP.

The objects to be achieved with the present disclosure are not limited to what has been particularly described hereinabove and other objects not described herein will be more clearly understood by persons skilled in the art from the following detailed description.

According to an aspect of the present disclosure, provided herein is a method of receiving a paging message by a user equipment (UE) in a wireless communication system. The method may include: receiving a wake-up signal (WUS) configuration related to WUS reception; receiving an offset value related to a paging occasion (PO); monitoring a physical downlink control channel (PDCCH) for a paging radio network temporary identity (P-RNTI) in first type paging PDCCH monitoring occasions (MOs) which are after a WUS MO, based on detection of a WUS in the WUS MO based on the WUS configuration; detecting the PDCCH having a cyclic redundancy check (CRC) scrambled with the P-RNTI based on monitoring of the PDCCH; and acquiring the paging message based on the PDCCH. The first type paging PDCCH MOs may be respectively determined by WUS MOs based on the WUS configuration and by the offset value.

In another aspect of the present disclosure, provided herein is a user equipment (UE) for receiving a paging message in a wireless communication system. The UE includes: at least one transceiver; at least one processor; and at least one computer memory operably connectable to the at least one processor and storing instructions that, when executed, cause the at least one processor to perform operations. The operations may include: receiving a wake-up signal (WUS) configuration related to WUS reception; receiving an offset value related to a paging occasion (PO); monitoring a physical downlink control channel (PDCCH) for a paging radio network temporary identity (P-RNTI) in first type paging PDCCH monitoring occasions (MOs) which are after a WUS MO, based on detection of a WUS in the WUS MO based on the WUS configuration; detecting the PDCCH having a cyclic redundancy check (CRC) scrambled with the P-RNTI based on monitoring of the PDCCH; and acquiring the paging message based on the PDCCH. The first type paging PDCCH MOs may be respectively determined by WUS MOs based on the WUS configuration and by the offset value.

In another aspect of the present disclosure, provided herein is a processing device in a wireless communication system. The processing device includes: at least one processor; and at least one computer memory operably connectable to the at least one processor and storing instructions that, when executed, cause the at least one processor to perform operations The operations may include: receiving a wake-up signal (WUS) configuration related to WUS reception; receiving an offset value related to a paging occasion (PO); monitoring a physical downlink control channel (PDCCH) for a paging radio network temporary identity (P-RNTI) in first type paging PDCCH monitoring occasions (MOs) which are after a WUS MO, based on detection of a WUS in the WUS MO based on the WUS configuration; detecting the PDCCH having a cyclic redundancy check (CRC) scrambled with the P-RNTI based on monitoring of the PDCCH; and acquiring a paging message based on the PDCCH. The first type paging PDCCH MOs may be respectively determined by WUS MOs based on the WUS configuration and by the offset value.

In another aspect of the present disclosure, provided herein is a computer-readable storage medium. The storage medium may include: receiving a wake-up signal (WUS) configuration related to WUS reception; receiving an offset value related to a paging occasion (PO); monitoring a physical downlink control channel (PDCCH) for a paging radio network temporary identity (P-RNTI) in first type paging PDCCH monitoring occasions (MOs) which are after a WUS MO, based on detection of a WUS in the WUS MO based on the WUS configuration; detecting the PDCCH having a cyclic redundancy check (CRC) scrambled with the P-RNTI based on monitoring of the PDCCH; and acquiring a paging message based on the PDCCH. The first type paging PDCCH MOs may be respectively determined by WUS MOs based on the WUS configuration and by the offset value.

In another aspect of the present disclosure, provided herein is a method of transmitting a paging message to a user equipment (UE) by a base station (BS) in a wireless communication system. The method may include transmitting a wake-up signal (WUS) configuration related to WUS transmission; transmitting an offset value related to a paging occasion (PO); transmitting a physical downlink control channel (PDCCH) having a cyclic redundancy check (CRC) scrambled with a paging radio network temporary identity (P-RNTI) in first type paging PDCCH monitoring occasions (MOs) which are after a WUS MO, based on transmission of a WUS in the WUS MO based on the WUS configuration; and transmitting the paging message based on the PDCCH. The first type paging PDCCH MOs may be respectively determined by WUS MOs based on the WUS configuration and by the offset value.

In another aspect of the present disclosure, provided herein is a base station (BS) for transmitting a paging message to a user equipment (UE) in a wireless communication system. The BS includes: at least one transceiver; at least one processor; and at least one computer memory operably connectable to the at least one processor and storing instructions that, when executed, cause the at least one processor to perform operations. The operations may include: transmitting a wake-up signal (WUS) configuration related to WUS transmission; transmitting an offset value related to a paging occasion (PO); transmitting a physical downlink control channel (PDCCH) having a cyclic redundancy check (CRC) scrambled with a paging radio network temporary identity (P-RNTI) in first type paging PDCCH monitoring occasions (MOs) which are after a WUS MO, based on transmission of a WUS in the WUS MO based on the WUS configuration; and transmitting the paging message based on the PDCCH. The first type paging PDCCH MOs may be respectively determined by WUS MOs based on the WUS configuration and by the offset value.

In each aspect of the present disclosure, the method by the UE, or the operations in the UE, the processing device, or the storage medium may include, based on failure of detection of the WUS in the WUS MO, omitting monitoring of the PDCCH for the P-RNTI in the first type paging PDCCH MO determined by the WUS MO and the offset value, and monitoring the WUS in a next WUS MO of the WUS MO in which detection of the WUS fails.

In each aspect of the present disclosure, the method by the BS or the operations in the BS may include, based on non-transmission of the WUS in the WUS MO, skipping, to the UE, transmission of the PDCCH having the CRC scrambled with the P-RNTI in the first type paging PDCCH MO determined by the WUS MO and the offset value, and transmitting the WUS in a next WUS MO of the WUS MO in which transmission of the WUS is skipped.

In each aspect of the present disclosure, the WUS may include a UE-related identity (ID), a cell ID, or a tracking area ID.

In each aspect of the present disclosure, based on the WUS including a UE-related identity (ID), an additional ID may be derived based on a slot index of a slot in which the WUS is detected and on a predetermined value N.

In each aspect of the present disclosure, the additional ID may be a UE ID, a UE group ID, or a UE subgroup ID.

In each aspect of the present disclosure, the WUS may include a system information change, tracking area information, or radio access network (RAN) area information, instead of the UE-related ID.

In each aspect of the present disclosure, a paging search space configuration may be provided to the UE by the BS. Second type paging PDCCH MOs may be determined based on the paging search space configuration. The first type paging PDCCH MOs may be distinguished from the second type paging PDCCH MOs.

In each aspect of the present disclosure, a downlink control information (DCI) format for the first type paging PDCCH MOs and a DCI format for the second type paging PDCCH MOs may be different.

In each aspect of the present disclosure, the method or the operations may include assuming a paging PDCCH MO of a predetermined type based on overlap between the first type paging PDCCH MOs and the second type paging PDCCH MOs.

In each aspect of the present disclosure, the P-RNTI for the first type paging PDCCH MOs and a P-RNTI for the second type paging PDCCH MOs may be different.

The foregoing solutions are merely a part of the examples of the present disclosure and various examples into which the technical features of the present disclosure are incorporated may be derived and understood by persons skilled in the art from the following detailed description.

According to some implementations, power consumption of a UE is reduced.

According to some implementations, signaling overhead is reduced since a paging occasion is determined based on a low-power (LP) wake-up signal (WUS).

According to some implementations, a network does not need to consider all UEs connected thereto, and UE(s) are quickly paged by shortening a paging occasion cycle in consideration of only UE(s) associated with the LP-WUS.

According to some implementations, delay/latency occurring during wireless communication between communication devices is reduced.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure.

The accompanying drawings, which are included to provide a further understanding of the present disclosure, illustrate examples of implementations of the present disclosure and together with the detailed description serve to explain implementations of the present disclosure.

DETAILED DESCRIPTION

Figure 1:
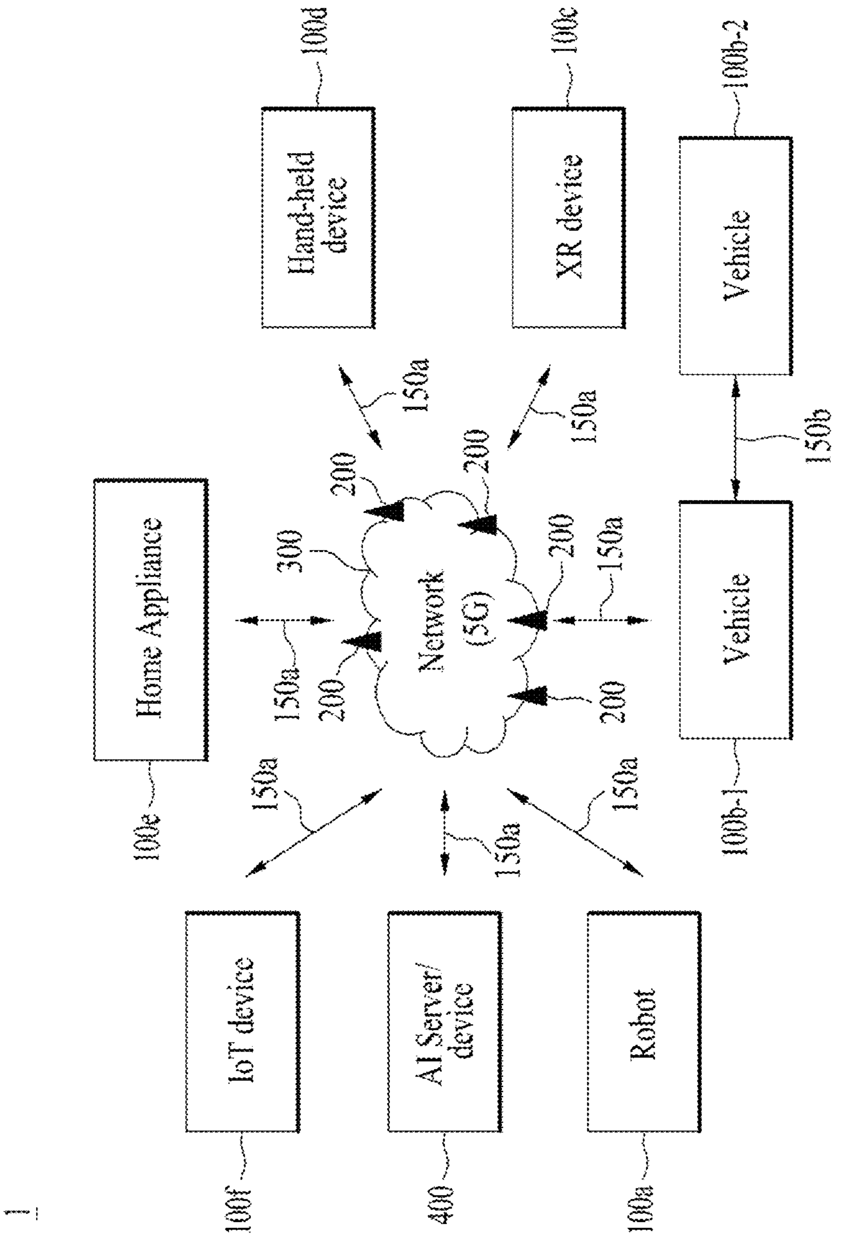
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.304, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The “cell” of the geographic area may be understood as coverage within which a node may provide services using a carrier, and the “cell” of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the “cell” of radio resources used by the node. Accordingly, the term “cell” may be used to indicate service coverage by the node sometimes, radio resources at other times, or a range that a signal using the radio resources may reach with valid strength at other times.

In 3GPP communication standards, the concept of the cell is used in order to manage radio resources. The “cell” associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

In a dual connectivity (DC) operation, the term special cell (SpCell) refers to a Pcell of a master cell group (MCG) or a primary secondary cell (PSCell) of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes the PSCell and 0 or more Scells. The PSCell is a primary Scell of the SCG. For a UE in RRC_CONNECTED state, that is not configured with CA or DC, only one serving cell including only the Pcell is present. For a UE in RRC_CONNECTED state, that is configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

For a UE that is configured with CA and is not configured with DC, a Pcell PUCCH group (also called a primary PUCCH group) including the Pcell and 0 or more Scells and an Scell PUCCH group (also called a secondary PUCCH group) including only Scell(s) may be configured. For the Scell, an Scell on which a PUCCH associated with the corresponding cell is transmitted (hereinafter, a PUCCH Scell) may be configured. An Scell for which a PUCCH Scell is indicated belongs to the Scell PUCCH group (i.e., the secondary PUCCH group) and PUCCH transmission of related uplink control information (UCI) is performed on the PUCCH Scell. If a PUCCH Scell is not indicated for an Scell or a cell which is indicated for PUCCH transmission for the Scell is a Pcell, the Scell belongs to the Pcell PUCCH group (i.e., the primary PUCCH group) and PUCCH transmission of related UCI is performed on the Pcell. Hereinbelow, if the UE is configured with the SCG and some implementations of the present disclosure related to a PUCCH are applied to the SCG, the primary cell may refer to the PSCell of the SCG. If the UE is configured with the PUCCH Scell and some implementations of the present disclosure related to the PUCCH are applied to the secondary PUCCH group, the primary cell may refer to the PUCCH Scell of the secondary PUCCH group.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), and etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, a PDCCH refers to a set of time-frequency resources (e.g., resource elements (REs)) carrying downlink control information (DCI), and a PDSCH refers to a set of time-frequency resources carrying DL data. A PUCCH, a PUSCH, and a PRACH refer to a set of time-frequency resources carrying UCI, a set of time-frequency resources carrying UL data, and a set of time-frequency resources carrying random access signals, respectively. In the following description, "the UE transmits/receives a PUCCH/PUSCH/PRACH" is used as the same meaning that the UE transmits/receives the UCI/UL data/random access signals on or through the PUCCH/PUSCH/PRACH, respectively. In addition, "the BS transmits/receives a PBCH/PDCCH/PDSCH" is used as the same meaning that the BS transmits the broadcast information/DCI/DL data on or through a PBCH/PDCCH/PDSCH, respectively.

In this specification, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives a synchronization signal block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, not receiving physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100*a*, vehicles 100*b*-1 and 100*b*-2, an extended reality (XR) device 100*c*, a hand-held device 100*d*, a home appliance 100*e*, an Internet of Things (IoT) device 100*f*, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100*a* to 100*f* may be connected to a network 300 via BSs 200. AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a* and 150*b* may be established between the wireless devices 100*a* to 100*f* and the BSs 200 and between the wireless devices 100*a* to 100*f*). Here, the wireless communication/connections such as UL/DL communication 150*a* and sidelink communication 150*b* (or, device-to-device (D2D) communication) may be established by various RATs (e.g., 5G NR). The wireless devices and the BSs/wireless devices may transmit/receive radio signals to/from each other through the wireless communication/connections 150*a* and 150*b*. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
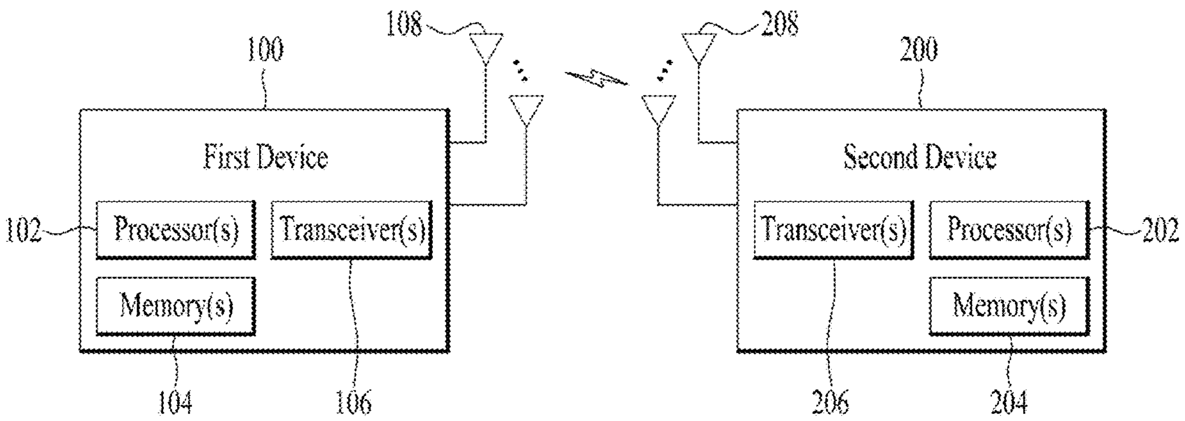
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100*x* and the BS 200} and/or {the wireless device 100*x* and the wireless device 100*x*} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN)

related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
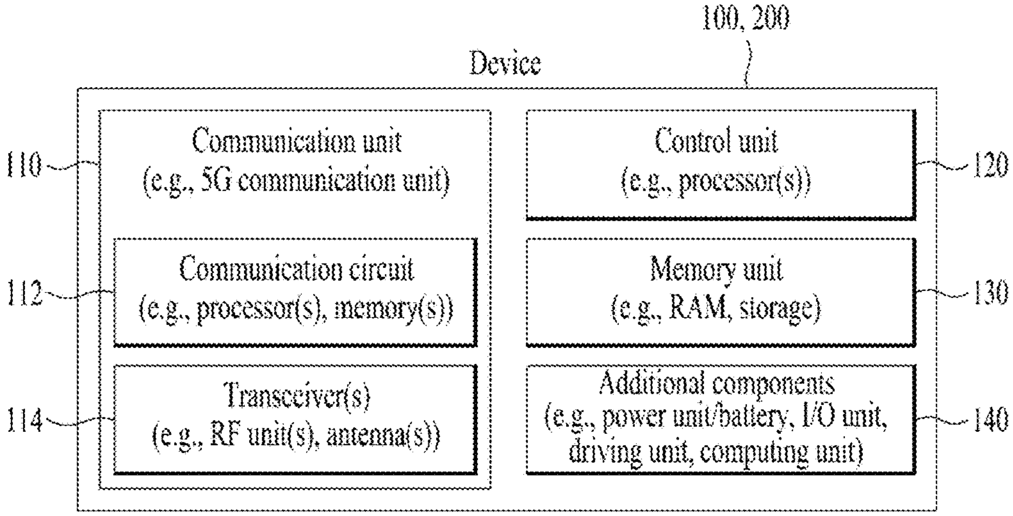
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a transitory memory, a non-transitory memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-transitory) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-transitory) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
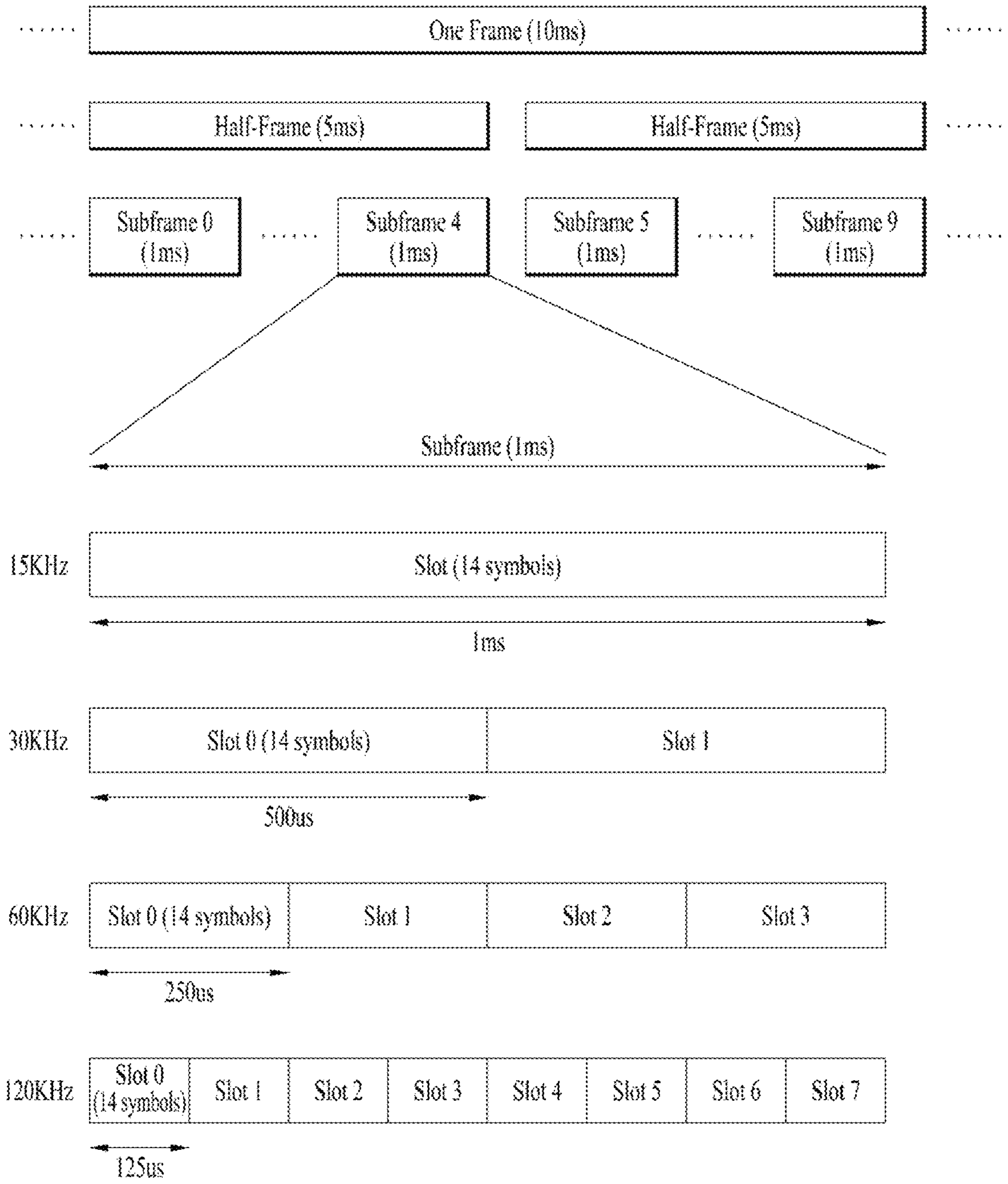
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix—OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f=(\Delta f_{max}*N_f/100)*T_c=10$ ms and is divided into two half-frames of 5 ms each. A basic time unit for NR is $T_c=1/(\Delta f_{max}*N_f)$ where $\Delta f_{max}=480*10^3$ Hz and $N_f=4096$. For reference, a basic time unit for LTE is $T_s=1/(\Delta f_{ref}*N_{f,}$ ref) where $\Delta f_{ref}=15*10^3$ Hz and $N_{f,ref}=2048$. $T_s$ and $T_c$ have the relationship of a constant $x=T_s/T_c=64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f=2^{\mu}*15$ kHz. The table below shows the number of OFDM symbols $$(N_{symb}^{slot})$$

per slot, the number of slots $$(N_{slot}^{frame,u})$$

per frame, and the number of slots $(N^{subframe,u}{}_{slot})$ per subframe.

TABLE 1

| $\mu$ | $N_{symb}^{slot}$ | $N_{slot}^{frame,u}$ | $N_{slot}^{subframe,u}$ |
|---|---|---|---|
| 0 | 14 | 10 | 1 |
| 1 | 14 | 20 | 2 |
| 2 | 14 | 40 | 4 |

TABLE 1-continued

| μ | $N^{slot}_{symb}$ | $N^{frame,u}_{slot}$ | $N^{subframe,u}_{slot}$ |
|---|---|---|---|
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^{\mu}*15$ kHz.

TABLE 2

| μ | $N^{slot}_{symb}$ | $N^{frame,u}_{slot}$ | $N^{subframe,u}_{slot}$ |
|---|---|---|---|
| 2 | 12 | 40 | 4 |

For a subcarrier spacing configuration u, slots may be indexed within a subframe in ascending order as follows:

$$n^u_s \in \{0, \ldots , n^{subframe,u}_{slot} - 1\}$$

and indexed within a frame in ascending order as follows:

$$n^u_{s,f} \in \{0, \ldots , n^{frame,u}_{slot} - 1\}.$$

Figure 5:
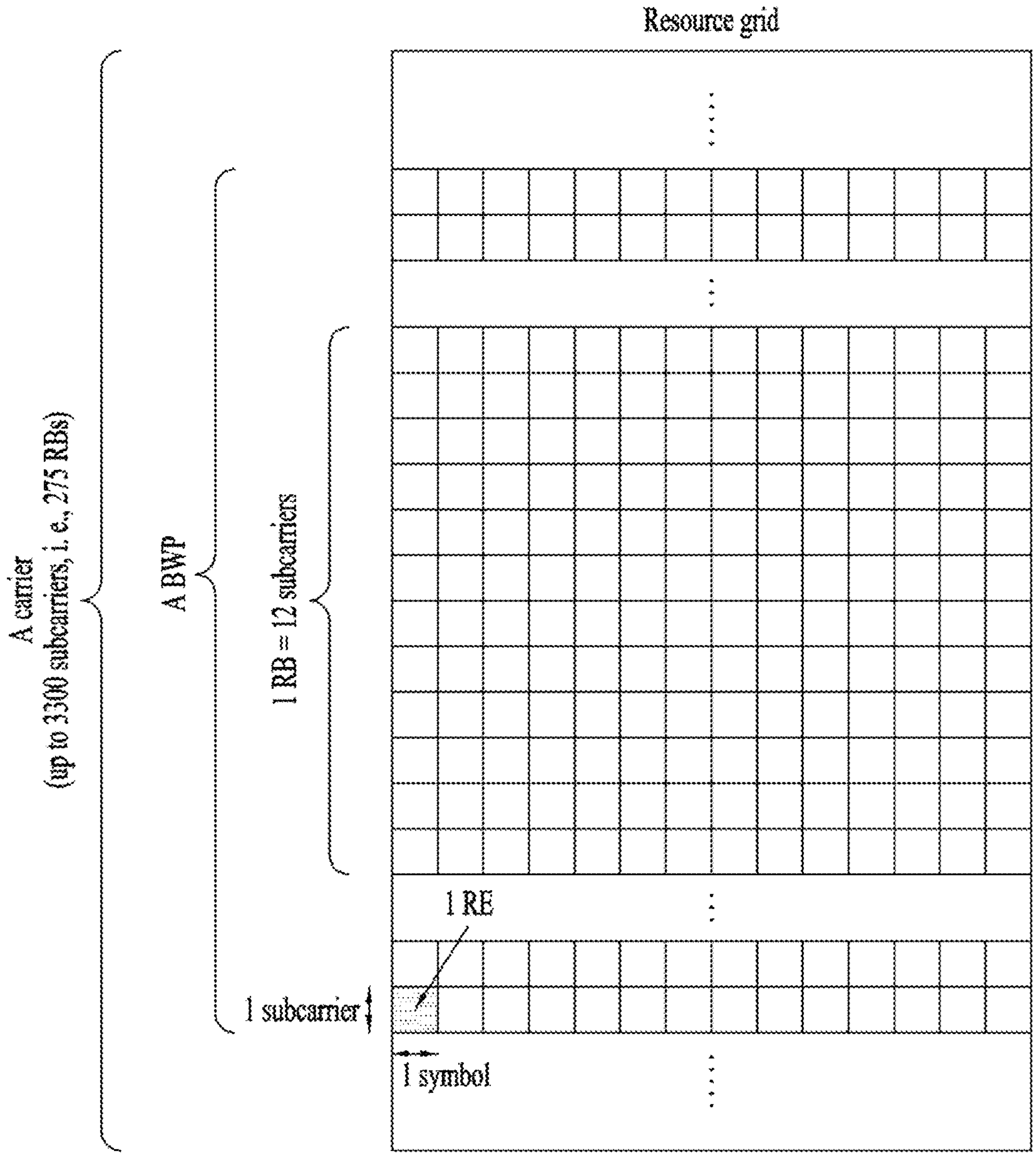
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $$N^{size,u}_{grid,x} * N^{RB}_{sc}$$

subcarriers and $$N^{subframe,u}_{symb}$$

OFDM symbols is defined, starting at a common resource block (CRB)

$$N^{start,u}_{grid}$$

indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB}=n^u_{CRB}+N^{size,u}_{BWP,i}$ where $M^{size,u}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS; ii) a CP; iii) a CRB $N^{start}_{BWP}=O_{carrier}+RB_{start}$ and the number of contiguous RBs $N^{size}_{BWP}=L_{RB}$ provided by an RRC parameter locationAndBandwidth, which indicates an offset $RB_{set}$ and a length $L_{RB}$ as a resource indicator value (RIV) on the assumption of $N^{start}_{BWP}=275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to interleaved mapping or non-interleaved mapping. In some implementations, VRB n may be mapped to PRB n for non-interleaved VRB-to-PRB mapping.

A UE for which CA is configured may be configured to use one or more cells. When the UE is configured to have multiple serving cells, the UE may be configured to have one or multiple cell groups. The UE may also be configured to have multiple cell groups associated with different BSs. Alternatively, the UE may be configured to have multiple cell groups associated with a single BS. Each cell group of the UE consists of one or more serving cells and includes a single PUCCH cell configured with PUCCH resources. The PUCCH cell may be a Pcell or an Scell configured as the PUCCH cell among Scells of a corresponding cell group. Each serving cell of the UE belongs to one of cell groups of the UE and does not belong to multiple cell groups.

NR frequency bands are defined as two types of frequency ranges, i.e., FR1 and FR2. FR2 is also referred to as millimeter wave (mmW). The following table shows frequency ranges within which NR may operate.

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 6:
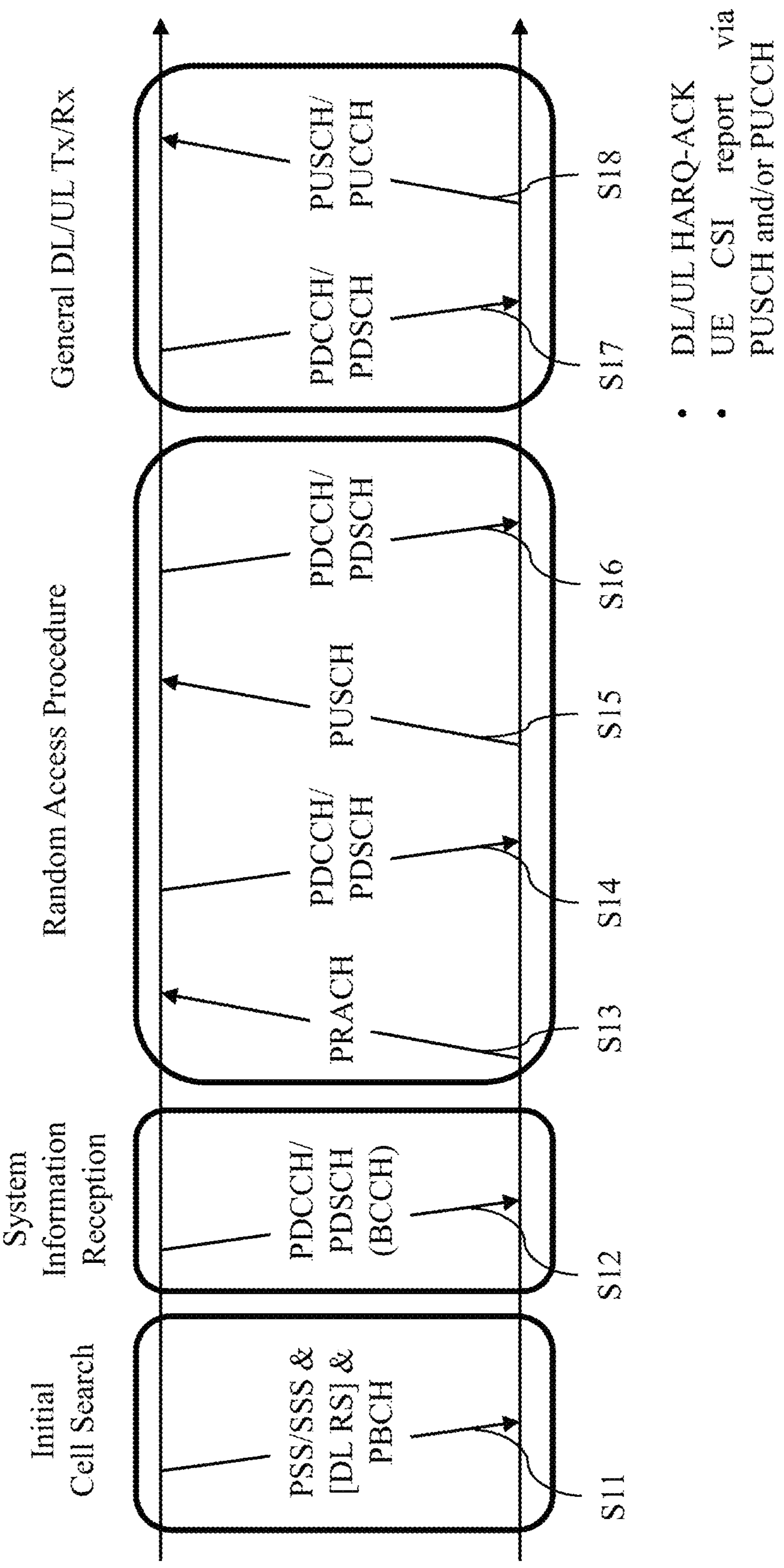
FIG. 6 illustrates physical channels and a signal transmission/reception procedure using the physical channels in a 3rd generation partnership project based (3GPP-based) communication system as an exemplary wireless communication system.

FIG. 6 is a diagram illustrating physical channels and a signal transmission/reception procedure using the physical channels in a 3GPP-based communication system as an exemplary wireless communication system.

When the UE is powered on or when the UE has been disconnected from the wireless communication system, the UE searches for a cell to camp on and performs initial cell search involving synchronization with a BS in the cell (S11). For the initial cell search, the UE receives a synchronization signal block (SSB) (also referred to as a SSB/PBCH block) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may camp on the cell. Subsequently, the UE may monitor a PDCCH in the cell and acquire more specific system information by receiving a PDSCH based on DCI carried on the PDCCH (S12).

Subsequently, to complete connection to the BS, the UE may perform a random access procedure (S13 to S16). In the random access procedure, for example, the UE may transmit a preamble on a PRACH (S13) and receive a PDCCH and a random access response (RAR) for the preamble on a PDSCH corresponding to the PDCCH (S14). When the UE fails in receiving the RAR directed to the UE, the UE may attempt to retransmit the preamble. In the case of contention-based random access, the UE may transmit a PUSCH based on a UL resource assignment included in the RAR (S15), and perform a contention resolution procedure including reception of a PDCCH and a PDSCH corresponding to the PDCCH (S16).

After the above procedure, the UE may receive a PDCCH/PDSCH from the BS (S17) and transmit a PUSCH/PUCCH to the BS (S18) in a general UL/DL signal transmission procedure. Control information that the UE transmits to the BS is generically called uplink control information (UCI). The UCI includes a hybrid automatic repeat and request acknowledgement/negative acknowledgement (HARQ ACK/NACK), a scheduling request (SR), and channel state information (CSI). The CSI includes a channel quality indicator (CQI), a precoding matrix indicator (PMI), and/or a rank indication (RI). In general, UCI is transmitted on the PUCCH. However, when control information and data should be transmitted simultaneously, the control information may be transmitted on the PUSCH. In addition, the UE may transmit the UCI aperiodically on the PUSCH, upon receipt of a request/command from a network.

Figure 7:
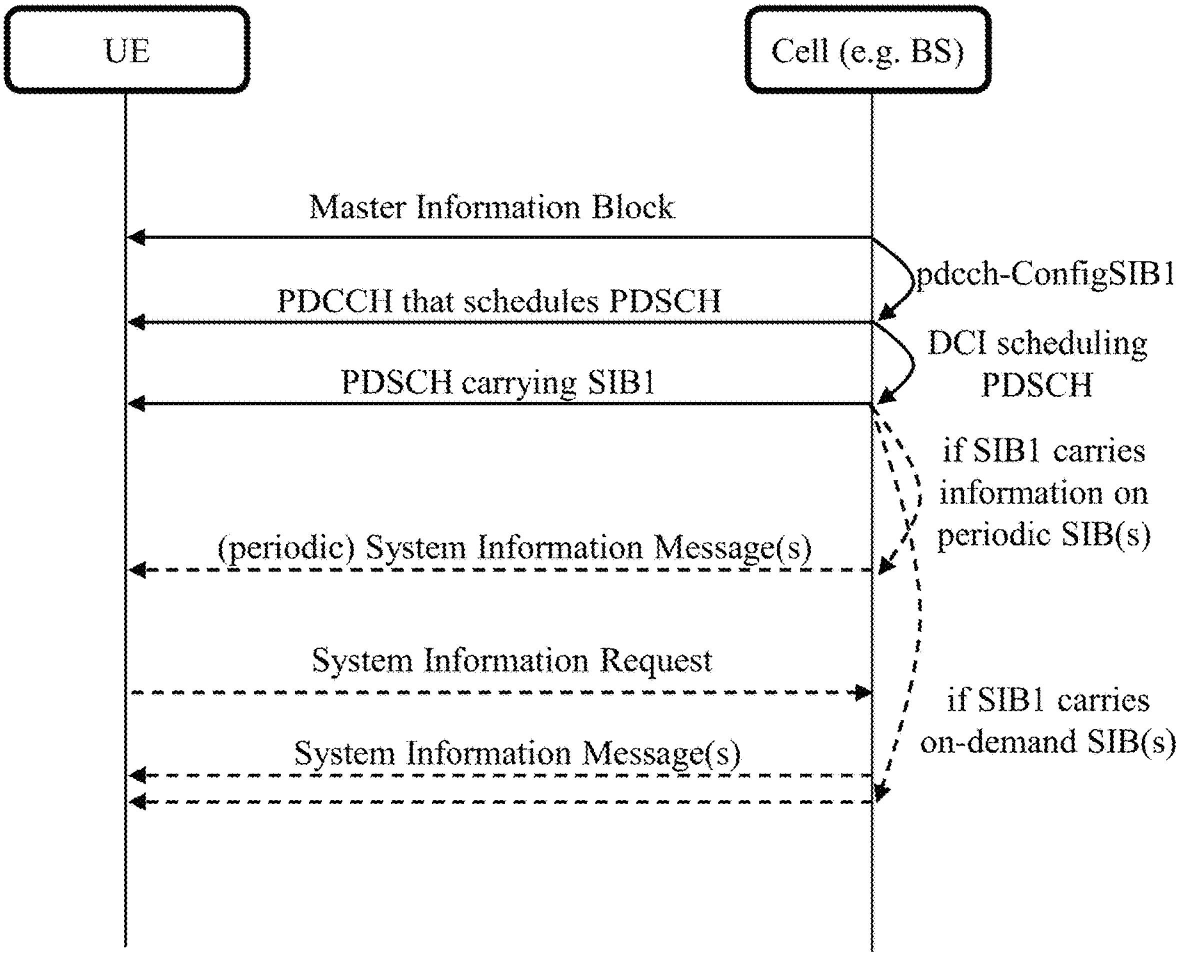
FIG. 7 illustrates a system information (SI) acquisition procedure.

FIG. 7 illustrates a system information (SI) acquisition procedure. The UE may acquire access stratum/non-access stratum (AS/NAS) information from the SI acquisition procedure. The SI acquisition procedure may be applied to UEs in the following states: RRC_IDLE, RRC_INACTIVE, and RRC_CONNECTED. RRC_CONNECTED refers to a state in which the UE has established an RRC connection with the network. RRC_IDLE refers to a state in which the UE is not registered in a specific cell and does not receive AS context and other information from the network. RRC_INACTIVE refers to a state in which the UE remains in a state called CM-CONNECTED where the UE has a signaling connection with the core network for connection management (CM) and is capable of moving within an area defined by the radio access network (RAN) (e.g., BS(s)) without notifying the RAN. CM_CONNECTED refers to a state in which the UE has a NAS signaling connection with the core network. CM_IDLE refers to a state in which the UE has no NAS signaling connection.

In the 3GPP based system, system information (SI) may be classified into a master information block (MIB) and a plurality of system information blocks (SIBs). MIB and a plurality of SIBs are divided into minimum system information (SI) and other SI, where the minimum SI is comprised of MIB and SystemInformationBlock1 (SIB1) and comprises basic information required for initial access and information for acquiring any other SI. SIB1 may be referred to as remaining minimum system information (RMSI). The details may be found in the following.

The MIB is always transmitted on the BCH with a periodicity of 80 ms and repetitions made within 80 ms. The MIB includes information/parameters related to SIB1 reception and is transmitted through the PBCH in the SSB. During initial cell selection, the UE assumes that a half-frame including SSB(s) is repeated with a periodicity of 20 ms. The UE may determine based on the MIB whether there is a control resource set (CORESET) for a Type0-PDCCH common search space. The Type0-PDCCH common search space is a kind of PDCCH search space and used to transmit a PDCCH that schedules an SI message. When the Type0-PDCCH common search space exists, the UE may determine based on information in the MIB (e.g., pdcch-ConfigSIB1) (i) a plurality of consecutive RBs and one or more consecutive symbols included in a CORESET and (ii) a PDCCH occasion (i.e., a time-domain position for PDCCH reception). When there is no Type0-PDCCH common search space, pdcch-ConfigSIB1 provides information regarding a frequency position where the SSB/SIB1 exists and information regarding a frequency range where the SSB/SIB1 does not exist.

The SIB1 is transmitted on the downlink shared channel (DL-SCH) with a periodicity of 160 ms and variable transmission repetition periodicity within 160 ms. The default transmission repetition periodicity of SIB1 is 20 ms but the actual transmission repetition periodicity is up to network implementation. SIB1 includes information regarding availability and scheduling (e.g., transmission periodicity and SI-window size) of the remaining SIBs (hereinafter referred to as SIBx, where x is an integer greater than and equal to 2). For example, SIB1 may indicate whether SIBx is periodically broadcast or provided at the request of the UE in an on-demand way. When SIBx is provided in an on-demand way, SIB1 may include information necessary for the UE to perform an SI request. SIB1 is a cell-specific SIB. A PDCCH that schedules SIB1 is transmitted in the Type0-PDCCH common search space, and SIB1 is transmitted through a PDSCH indicated by the PDCCH.

SIBx is included in the SI message and transmitted through the PDSCH. Each SI message is transmitted within a periodically occurring time window (i.e., SI-window).

Figure 8:
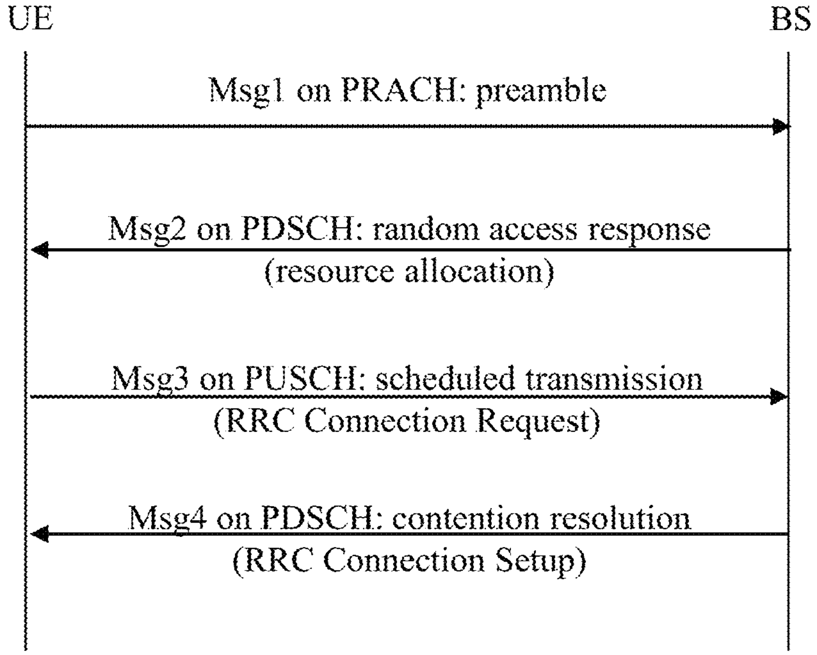
FIG. 8 illustrates random access procedures applicable to implementation(s) of the present disclosure.
Figure 8:
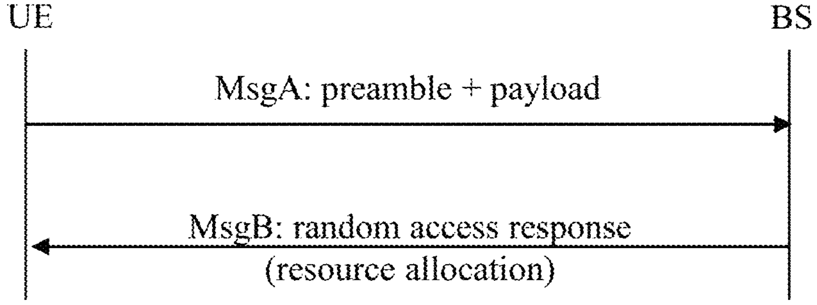

FIG. 8 illustrates random access procedures applicable to implementation(s) of the present disclosure. Particularly, FIG. 8(*a*) illustrates a 4-step random access procedure, and FIG. 8(*b*) illustrates a 2-step random access procedure.

A random access procedure may be used for various purposes including initial access, UL synchronization adjustment, resource allocation, handover, radio link reconfiguration after radio link failure, and positioning. Random access procedures are classified into a contention-based procedure and a dedicated (i.e., non-contention-based) procedure. The contention-based random access procedure generally involves initial access, whereas the dedicated random access procedure is used for UL synchronization reconfiguration in the event of handover, DL data arrival at a network, and positioning. In the contention-based random access procedure, the UE randomly selects a random access (RA) preamble. Accordingly, it is possible for a plurality of UEs to simultaneously transmit the same RA preamble, and thus a subsequent contention resolution process is required. In the dedicated random access procedure, the UE uses an RA preamble uniquely allocated to the UE by the BS. Therefore, the UE may perform the random access procedure without collision with other UEs.

Referring to FIG. 8(*a*), the contention-based random access procedure includes the following four steps. The messages transmitted in steps 1 to 4 may be referred to as message 1 (Msg1) to message 4 (Msg4), respectively.

Step 1: The UE transmits an RA preamble on a PRACH.

Step 2: The UE receives an RAR on a PDSCH from the BS.

Step 3: The UE transmits UL data on a PUSCH to the BS. The UL data includes a Layer 2 (L2)/Layer 3 (L3) message.

Step 4: The UE receives a contention resolution message on the PDSCH from the BS.

The UE may receive random access information in system information from the BS. For example, information regarding RACH occasions associated with SSBs on a cell may be provided in system information. The UE may select an SSB whose reference signal received power (RSRP), which is measured based on the SSB, exceeds a threshold from among SSBs received on the cell. Then, the UE may transmit an RA preamble on a PRACH associated with the selected SSB. For example, When the UE needs random access, the UE transmits Msg1 (e.g., a preamble) on a PRACH to the BS. The BS may identify each RA preamble by a time/frequency resource (hereinafter, RA occasion (RO)) carrying the RA preamble, and a random access preamble index (PI). Upon receipt of the RA preamble from the UE, the BS transmits a random access response (RAR) message to the UE on a PDSCH. To receive the RAR message, the UE monitors an L1/L2 control channel (e.g., PDCCH) with a cyclic redundancy check (CRC) masked with a random access-RNTI (RA-RNTI), including scheduling information for the RAR message, within a preconfigured time window (e.g., ra-ResponseWindow). When receiving scheduling information on the PDCCH masked with the RA-RNTI, the UE may receive an RAR message on a PDSCH indicated by the scheduling information. The UE then checks whether there is an RAR directed to the UE in the RAR message. The presence or absence of the RAR directed to the UE may be determined by checking whether there is a random access preamble ID (RAPID) for the preamble transmitted by the UE. The index of the preamble transmitted by the UE may be identical to the RAPID. The RAR includes the index of the corresponding RA preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)). Upon receipt of the RAR, the UE transmits Msg3 on a PUSCH according to the UL scheduling information and the timing offset value in the RAR. Msg3 may include the ID (or global ID) of the UE. Further, Msg3 may include RRC connection request-related information (e.g., RRCSetupRequest message) for initial access to the network. After receiving Msg3, the BS transmits a contention resolution message, that is, Msg4 to the UE. When the UE receives the contention resolution message and succeeds in contention resolution, the TC-RNTI is changed to a C-RNTI. Msg4 may include the ID of the UE/RRC connection-related information (e.g., an RRCSetup message). When information transmitted in Msg3 does not match information received in Msg4 or when the UE has not received Msg4 for a predetermined time, the UE may determine that the contention resolution has failed and retransmit Msg3.

The dedicated random access procedure includes the following three steps. Messages transmitted in step 0 to step 2 may be referred to as Msg0 to Msg2, respectively. The BS may trigger the dedicated random access procedure by a PDCCH serving the purpose of commanding RA preamble transmission (hereinafter, referred to as a PDCCH order).

Step 0: The BS allocates an RA preamble to the UE by dedicated signaling.

Step 1: The UE transmits the RA preamble on a PRACH.

Step 2: The UE receives an RAR on a PDSCH from the BS.

Step 1 and step 2 of the dedicated random access procedure may be the same as step 1 and step 2 of the contention-based random access procedure.

The NR system may require lower latency than the legacy system. Particularly for a latency-sensitive service such as URLLC, the 4-step random access procedure may not be preferable. A low-latency random access procedure may be needed for various scenarios in the NR system. When implementation(s) of the present disclosure are realized along with a random access procedure, the implementation(s) of the present disclosure may be carried out together with the following 2-step random access procedure to reduce latency involved in the random access procedure.

Referring to FIG. 8(*b*), the 2-step random access procedure may be performed in two steps: transmission of MsgA from the UE to the BS and transmission of MsgB from the BS to the UE. The MsgA transmission may include transmission of an RA preamble on a PRACH and transmission of UL payload on a PUSCH. In the MsgA transmission, the PRACH and the PUSCH may be transmitted in time division multiplexing (TDM). Alternatively, the PRACH and the PUSCH may be transmitted in frequency division multiplexing (FDM) in the MsgA transmission.

Upon receipt of MsgA, the BS may transmit MsgB to the UE. MsgB may include an RAR for the UE.

An RRC connection request-related message (e.g., RRCSetupRequest message) requesting establishment of a connection between the RRC layer of the BS and the RRC layer of the UE may be included in the payload of MsgA. In this case, MsgB may be used to transmit RRC connection-related information (e.g., RRCSetup message). In contrast, the RRC connection request-related message (e.g., RRCSetupRequest message) may be transmitted on a PUSCH based on a UL grant in MsgB. In this case, RRC connection-related information (e.g., RRCSetup message) related to the RRC connection request may be transmitted on a PDSCH associated with the PUSCH transmission after the PUSCH transmission based on MsgB.

Hereinafter, physical channels that may be used in the 3GPP-based wireless communication system will be described in detail.

APDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

Figure 9:
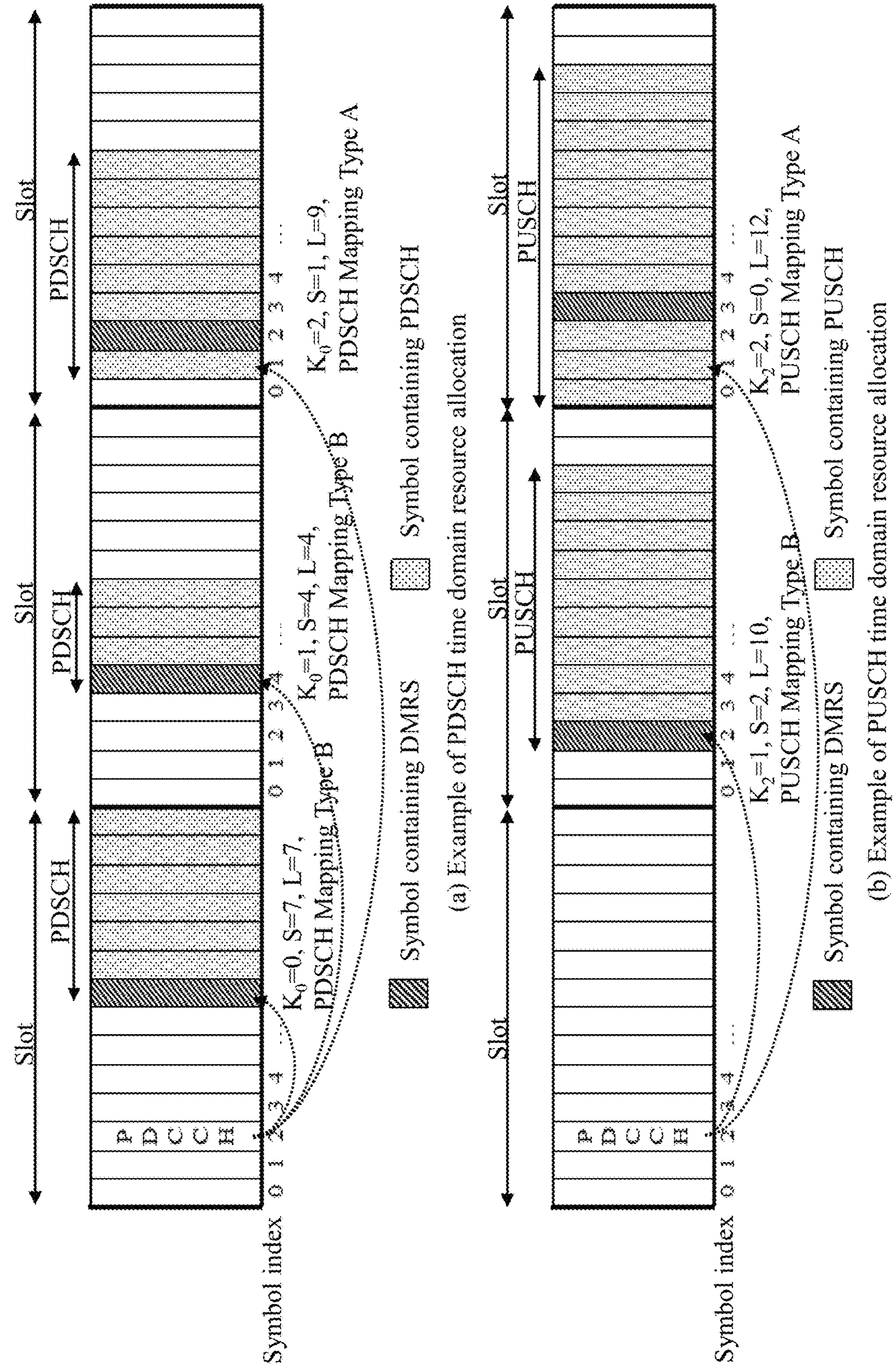
FIG. 9 illustrates an example of physical downlink shared channel (PDSCH) time domain resource assignment (TDRA) by a physical downlink control channel (PDCCH) and an example of physical uplink shared channel (PUSCH) TDRA by the PDCCH.

FIG. 9 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset Ko, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. Ko for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling. In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in this specification, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

A CORESET, which is a set of time-frequency resources on which the UE is capable of monitoring a PDCCH, may be defined and/or configured. The UE may be configured with one or more CORESETs. The CORESET has a time duration of one to three OFDM symbols and includes a set of PRBs. The PRBs included in the CORESET and the CORESET duration may be provided to the UE through higher layer (e.g., RRC) signaling. The UE may monitor a set of PDCCH candidates in configured CORESET(s) according to corresponding search space sets. In the present disclosure, monitoring implies decoding (blind decoding) of each PDCCH candidate based on monitored DCI formats. The MIB on a PBCH provides the UE with parameters (e.g., CORESET #0 configuration) for monitoring a PDCCH that schedules a PDSCH carrying SIB1. The PBCH may indicate that there is no associated SIB1. In this case, the UE may be provided with not only a frequency range where the UE is allowed to assume that there is no SSB associated with SSB1 but also may be provided with another frequency range where the UE is allowed to discover an SSB associated with SIB1. CORESET #0, which is a CORESET for scheduling at least SIB1, may be configured through the MIB or dedicated RRC signaling.

The set of the PDCCH candidates that the UE monitors is defined in terms of PDCCH search space sets. The search space sets may be common search space (CSS) sets or UE-specific search space (USS) sets. Each CORESET configuration is associated with one or more search space sets and each search space set is associated with one CORESET configuration.

A UE monitors a set of PDCCH candidates in one or more CORESETs on the active DL BWP on each activated serving cell configured with PDCCH monitoring according to corresponding search space sets where monitoring implies receiving each PDCCH candidate and decoding according to the monitored DCI formats.

The following table shows PDCCH search spaces.

TABLE 4

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.

searchSpaceId: indicates the ID of the SS set.

controlResourceSetId: indicates the CORESET associated with the SS set.

monitoringSlotPeriodicityAndOffset: indicates a PDCCH monitoring periodicity (in a unit of slot) and a PDCCH monitoring offset (in a unit of slot).

monitoringSymbolsWithinSlot: indicates first OFDMA symbol(s) for PDCCH monitoring in a slot in which the PDCCH monitoring is configured. The first OFDMA symbol(s) are indicated by a bitmap, and each bit corresponds to a respective one of OFDMA symbols in the slot. The MSB of the bitmap corresponds to the first OFDM symbol in the slot. OFDMA symbol(s) corresponding to bit(s) with a value of 1 corresponds to the first symbol(s) in the CORESET in the slot.

nrofCandidates: indicates the number of PDCCH candidates (e.g., one of 0, 1, 2, 3, 4, 5, 6, and 8) for each AL (where AL={1, 2, 4, 8, 16}).

searchSpaceType: indicates whether the SS type is the CSS or USS.

DCI format: indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

Figure 10:
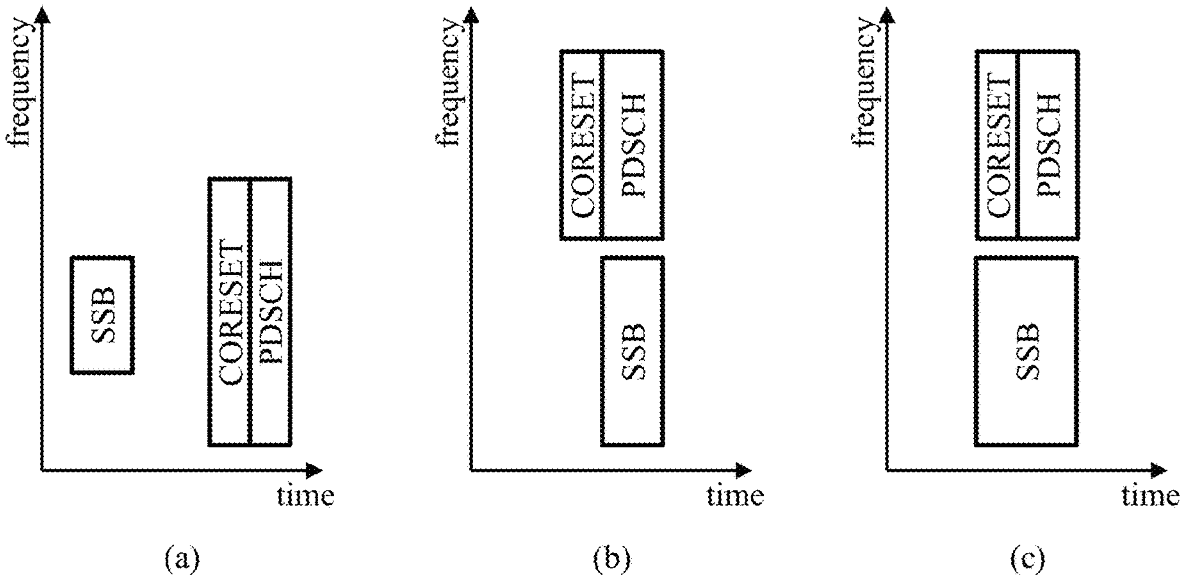
FIG. 10 illustrates SSB and CORESET multiplexing patterns.

FIG. 10 illustrates SSB and CORESET multiplexing patterns. Specifically, FIG. 10(*a*) shows SSB and CORESET multiplexing pattern 1, FIG. 10(*b*) shows SSB and CORESET multiplexing pattern 2, and FIG. 10(*c*) shows SSB and CORESET multiplexing pattern 3. The SSB and CORESET multiplexing pattern may be predefined depending on the frequency range (FR) to which a corresponding cell belongs or the subcarrier spacing of an SSB or PDCCH.

As illustrated in FIG. 10, an SSB and CORESET may be multiplexed in the time domain, in the time and frequency domains, or in the frequency domain.

The set of the PDCCH candidates that the UE monitors is defined in terms of PDCCH search space sets. The search space sets may be common search space (CSS) sets or UE-specific search space (USS) sets. Each CORESET configuration is associated with one or more search space sets and each search space set is associated with one CORESET configuration.

A UE monitors a set of PDCCH candidates in one or more CORESETs on the active DL BWP on each activated serving cell configured with PDCCH monitoring according to corresponding search space sets where monitoring implies receiving each PDCCH candidate and decoding according to the monitored DCI formats.

Figure 11:
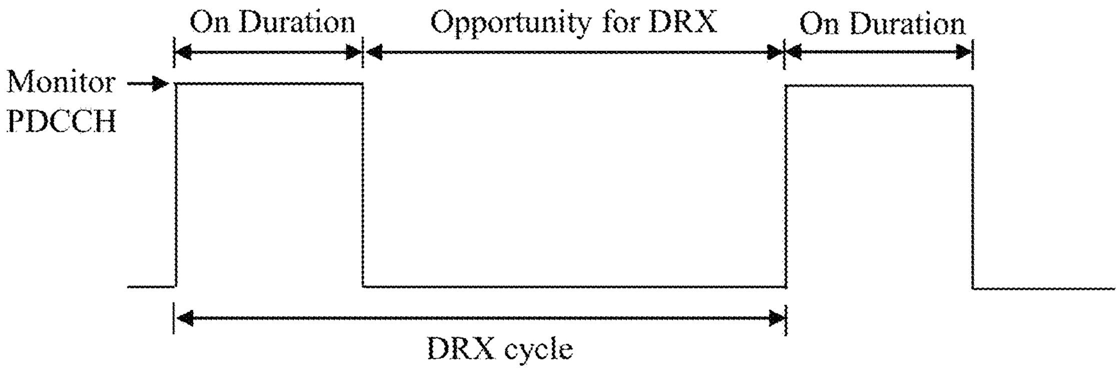
FIG. 11 illustrates a discontinuous reception (DRX) operation applicable to implementation(s) of the present disclosure.

FIG. 11 illustrates a discontinuous reception (DRX) operation. Specifically, FIG. 11 shows a DRX cycle for a UE in the RRC_CONNECTED state.

The UE may perform the DRX operation while executing the processes and/or methods according to implementation(s) of the present disclosure. DRX configurations/operations are defined in NR specifications (e.g., Rel-17). DRX, which is used to reduce unnecessary power consumption of the UE, has the following features. In DRX, a structure for the UE in the RRC_IDLE state (hereinafter referred to as I-DRX) and a structure for the UE in the RRC_CONNECTED state (hereinafter referred to as C-DRX) are defined separately. The two DRX structures are designed such that a period (e.g., active time period or on-duration period) in which the UE expects to receive a DL signal periodically occurs, thereby reducing unnecessary power consumption of the UE in other periods. In particular, in the case of C-DRX, the start position of the on-duration period is periodically defined according to NR Rel-16 specifications. In this case, the size (i.e., DRX cycle) of the configured period may be determined/configured through higher layer signaling such as RRC signaling provided by the BS to the UE.

Referring to FIG. 11, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, the UE may perform PDCCH monitoring/reception discontinuously in the time domain in the procedure and/or method according to implementation(s) of the present disclosure. For example, when DRX is configured, PDCCH reception occasions (e.g., slots with PDCCH search spaces) may be configured discontinuously according to a DRX configuration in the present disclosure. On the contrary, when DRX is not configured, the UE may perform PDCCH monitoring/reception continuously in the time domain. For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap. DRX configuration information is received through higher layer (e.g., RRC) signaling, and DRX ON/OFF is controlled by DRX commands from the MAC layer. Once DRX is configured, the UE may discontinuously perform PDCCH monitoring as shown in FIG. 8.

The following table describes a DRX operation of a UE. Referring to the following table, DRX configuration information is received by higher-layer signaling (e.g., RRC signaling), and DRX ON/OFF is controlled by a DRX command from the MAC layer. Once DRX is configured, the UE may perform PDCCH monitoring discontinuously, as illustrated in FIG. 11.

TABLE 5

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-onDurationTimer: configures the duration at the beginning of a DRX cycle.

Value of drx-SlotOffset: configures the delay before starting the drx-onDurationTimer.

Value of drx-InactivityTimer: the duration after the PDCCH occasion in which a PDCCH indicates a new UL or DL transmission for the MAC entity.

Value of drxRetransmissionTimerDL (per DL HARQ process except for the broadcast process): configures the maximum duration until a DL retransmission is received.

Value of drxRetransmissionTimerUL (per UL HARQ process): configures the maximum duration until a grant for UL retransmission is received.

Value of drx-HARQ-RTT-TimerDL (per DL HARQ process except for the broadcast process): configures the maximum duration from reception of initial DL transmission to reception of DL assignment for HARQ retransmission.

Value of drx-HARQ-RTT-TimerUL (per UL HARQ process): configures the maximum duration from reception of a grant for initial UL transmission to reception of a grant for UL retransmission.

drx-LongCycleStartOffset: configures the Long DRX cycle and drx-StartOffset which defines the subframe where the Long and Short DRX cycle starts.

drx-ShortCycle (optional): configures the Short DRX cycle.

drx-ShortCycleTimer (optional): configures the duration the UE shall follow the Short DRX cycle. For example, a value in multiples of the short DRX cycle may be configured by drx-CycleTimer. For example, the value of n may correspond to n*drx-ShortCycle.

The UE may perform PDCCH monitoring on serving cells within a DRX group if the DRX group is within the active time. In this case, the DRX group refers to a group of serving cells that are configured by RRC and have the same DRX active time. When DRX is configured, the Active Time for serving Cells in a DRX group includes the time while i) drx-onDurationTimer or drx-InactivityTimer configured for the DRX group is running; or ii) drx-RetransmissionTimerDL or drx-RetransmissionTimerUL is running on any serving Cell in the DRX group; or ra-ContentionResoultion-Timer or msgB-RsponseWindow is running; or a PDCCH indicating a new transmission addressed to the C-RNTI of a MAC entity of the UE has not been received after successful reception of a random access response for the Random Access Preamble not selected by the MAC entity among the contention-based random access preambles.

Figure 12:
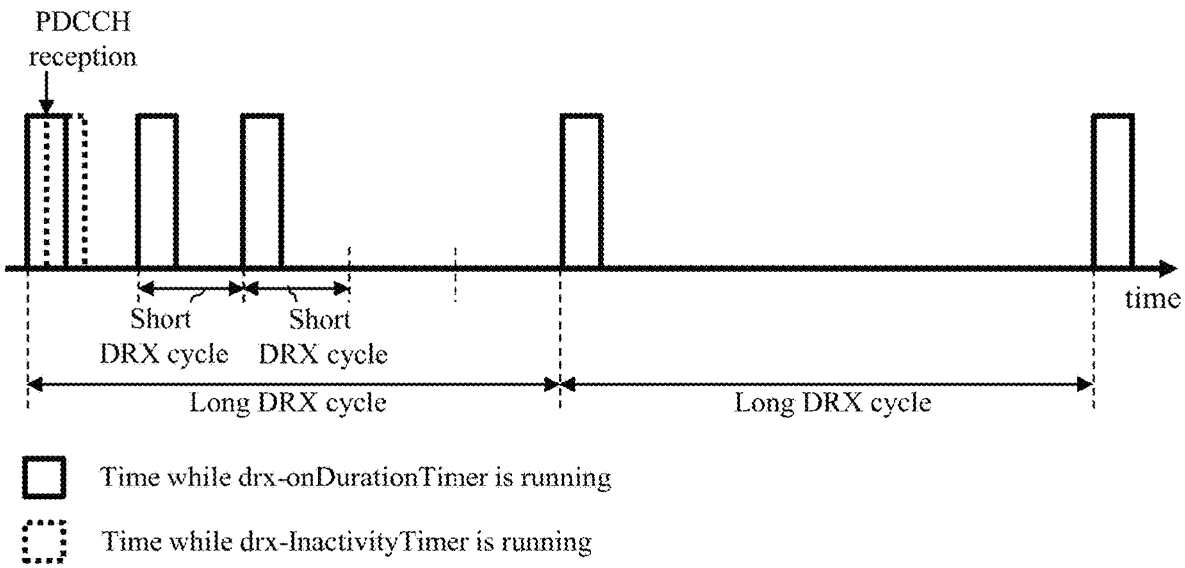
FIG. 12 illustrates a case in which a long DRX cycle and a short DRX cycle are configured.

FIG. 12 illustrates a case in which a long DRX cycle and a short DRX cycle are configured. Specifically, FIG. 12 shows a case in which drx-ShortCycleTimer is set to 2.

The BS may configure a long DRX cycle and an additional short DRX cycle, which is shorter than the long DRX cycle. If no short DRX cycle is configured, the UE may follow the long DRX cycle. When configuring the short DRX cycle, the BS may set the duration of the long DRX cycle to be a positive integer multiple of the short DRX cycle. If there is no data activity during the on-duration of the long DRX cycle, the UE may follow the long DRX cycle as if no short DRX cycle is configured. If there is data activity during the on-duration of the long DRX cycle, for example, while drx-onDurationTimer is running, the UE switches to the short DRX cycle and follows the short DRX cycle for a certain period of time (e.g., while drx-ShortCycleTimer is running). Referring to FIG. 12, if there is no data activity during the time that the UE follows the short DRX cycle, for example, if there is no data activity during the period defined by drx-ShortCycleTimer*drx-ShortCycle, the UE switches from short DRX cycles each having the duration by drx-ShortCycleTimer to the long DRX cycle.

When the UE has no ongoing data transmissions/receptions, the UE enters RRC_IDLE or RRC_INACTIVE to save power. When DL data for the UE arrives in the network, the network transmits a paging message on a paging occasion (PO) to trigger an RRC Setup procedure and an RRC Connection Resume procedure. The PO refers to a set of PDCCH monitoring occasions and may consist of multiple time slots (e.g., subframes or OFDM symbols). DCI with a CRC scrambled with a P-RNTI may be transmitted on the PO. By a DCI format (e.g., DCI format 10) with the CRC scrambled with the P-RNTI, for example, the following information may be transmitted:

- short message indicator according to Table 6
- short messages according to Table 7 in which bit 1 is the most significant bit (MSB)
- frequency domain resource assignment (FDRA)
- time domain resource assignment (TDRA)
- VRB-to-PRB mapping according to Table 8
- modulation and coding scheme
- transport block (TB) scaling
- tracking reference signal (TRS) availability indication
- reserved bits.

TABLE 6

| Bit field | Short Message indicator |
|---|---|
| 00 | Reserved |
| 01 | Only scheduling information for Paging, and TRS availability indication if trs-ResourceSetConfig is configured, are present in the DCI |
| 10 | Only short message, and TRS availability indication if trs-ResourceSetConfig is configured, are present in the DCI |
| 11 | Both scheduling information for Paging, TRS availability indication if trs-ResourceSetConfig is configured and short message are present in the DCI |

TABLE 7

| Bit | Short Message |
|---|---|
| 1 | systemInfoModification<br>If set to 1: indication of a Broadcast Control CHannel (BCCH) modification other than SIB6, SIB7 and SIB8. |

TABLE 7-continued

| Bit | Short Message |
|---|---|
| 2 | etwsAndCmasIndication<br>If set to 1: indication of an Earthquake and Tsunami Warning System (ETWS) primary notification and/or an ETWS secondary notification and/or a Commercial Mobile Alert Service (CMAS) notification. |
| 3 | stopPagingMonitoring<br>This bit can be used for only operation with shared spectrum channel access and if RRC parameter nrofPDCCH-MonitoringOccasionPerSSB-InPO is present.<br>If set to 1: indication that the UE may stop monitoring PDCCH occasion(s) for paging in this Paging Occasion as specified in 3GPP TS 38.304, clause 7.1. |
| 4 | systemInfoModification-eDRX<br>If set to 1: indication of a BCCH modification other than SIB6, SIB7 and SIB8. This indication applies only to UEs using eDRX cycle longer than the BCCH modification period. |
| 5-8 | Not used in this release of the specification, and shall be ignored by UE if received. |

TABLE 8

| Bit field mapped to index | VRB-to-PRB mapping |
|---|---|
| 0 | Non-interleaved |
| 1 | Interleaved |

In the present disclosure, a PDCCH carrying the DCI format with the CRC scrambled with the P-RNTI is called a paging PDCCH, and a PDSCH scheduled by the paging PDCCH is called a paging PDSCH. The UE may decode the paging PDSCH based on scheduling information (e.g., FDRA, a modulation and coding scheme, etc.) within the paging PDCCH. The paging PDSCH carries paging messages, which are used for notification to one or more UEs and may include one or more UE identities (IDs). The following tables illustrate a paging message and descriptions of fields within the paging message.

TABLE 9

```
-- ASN1START
-- TAG-PAGING-START
Paging ::=                    SEQUENCE {
   pagingRecordList                      OPTIONAL, -- Need N
   lateNonCriticalExtension            OCTET   STRING
OPTIONAL,                                     Paging-v1700-IEs
   nonCriticalExtension
OPTIONAL
}
Paging-v1700-IEs ::=          SEQUENCE {
   pagingRecordList-v1700           OPTIONAL, -- Need N
   pagingGroupList-r17                 OPTIONAL, -- Need N
   nonCriticalExtension                     SEQUENCE   { }
OPTIONAL
}
PagingRecordList ::=              SEQUENCE (SIZE(1..maxNrofPageRec)) OF
PagingRecord
PagingRecordList-v1700       ::=  SEQUENCE (SIZE(1..maxNrofPageRec)) OF
PagingRecord-v1700
PagingGroupList-r17 ::=           SEQUENCE (SIZE(1..maxNrofPageGroup-r17))
OF TMGI-r17
PagingRecord ::=              SEQUENCE {
   ue-Identity                       PagingUE-Identity,
   accessType                        ENUMERATED {non3GPP}
OPTIONAL, -- Need N
   ...
}
```

TABLE 9-continued

```
PagingRecord-v1700 ::=          SEQUENCE {
   pagingCause-r17                       ENUMERATED {voice}
OPTIONAL -- Need N
}
PagingUE-Identity ::=           CHOICE {
   ng-5G-S-TMSI                    ,
   fullI-RNTI                          I-RNTI-Value,
   ...
}
-- TAG-PAGING-STOP
-- ASN1STOP
```

TABLE 10

| PagingRecord field descriptions |
|---|
| accessType<br>Indicates whether the Paging message is originated due to the PDU sessions from the non-3GPP access. |
| pagingRecordList<br>If the network includes pagingRecordList-v1700, it includes the same number of entries, and listed in the same order, as in pagingRecordList (i.e. without suffix). |
| pagingCause<br>Indicates whether the Paging message is originated due to IMS voice. If this field is present, it implies that the corresponding paging entry is for IMS voice. If upper layers indicate the support of paging cause and if this field is not present but pagingRecordList-v1700 is present, it implies that the corresponding paging entry is for a service other than IMS voice. Otherwise, paging cause is undetermined. |

In multi-beam operations, the UE assumes that the same paging message is repeated in all transmitted beams. The paging message is same for both radio access network (RAN) initiated paging and core network (CN) initiated paging. One paging frame (PF) is one radio frame and may contain one or multiple PO(s) or starting point of a PO. The UE monitors one paging occasion (PO) per DRX cycle. The PF and PO for paging may be determined by predetermined equations. For example, in some implementations, a system frame number (SFN) for the PF may be determined by (SFN+PF_offset) mod T=(T div N)*(UE_ID mod N), and the index i_s indicating the index of the PO may be determined by i_s=floor(UE_ID) mod Ns, where T is the DRX cycle of the UE and determined by the shortest of the UE specific DRX value(s) and/or a default DRX value broadcast in system information, N is the number of total paging frames in T, Ns is the number of paging occasions for a PF, PF_offset is an offset used for PF determination, and UE_ID is a value determined based on 5G-S-TMSI. The following parameters may be signaled in SIB1: a parameter related to the number of POs per paging frame, Ns; a parameter used to derive the number of total paging frames in T, nAndPagingFrameOffset; a parameter related to the number of PDCCH monitoring occasions corresponding to SSBs in a PO, nrofPDCCH-MonitoringOccasionsPerSSB-InPO; and the length of a default DRX cycle. The values of N and PF_offset are derived from the parameter nAndPagingFrameOffset. The PDCCH monitoring occasions for paging are determined based on the following parameters: a parameter indicating the first PDCCH monitoring occasion for paging of each PO of the PF, firstPDCCH-MonitoringOccasionOfPO; and the parameter nrofPDCCH-MonitoringOccasionsPerSSB-InPO. For paging in the initial DL BWP, the parameter firstPDCCH-MonitoringOccasionOfPO may be signaled in SIB1. For paging in a DL BWP other than the initial DL BWP, the parameter firstPDCCH-MonitoringOccasionOfPO may be signaled in the corresponding BWP configuration.

The UE may use Paging Early Indication Pin RRC_IDLE and RRC_INACTIVE states in order to reduce power consumption. If PEI configuration is provided in system information, the UE in RRC_IDLE or RRC_INACTIVE state supporting PEI can monitor PEI using PEI parameters in system information. The UE monitors one PEI occasion per DRX cycle. A PEI occasion (PEI-O) is a set of PDCCH monitoring occasions and can consist of multiple time slots (e.g. subframes or OFDM symbols) where PEI can be sent. In multi-beam operations, the UE assumes that the same PEI is repeated in all transmitted beams. The time location of PEI-O for UE's PO is determined by a reference point and an offset. The reference point is the start of a reference frame determined by a frame-level offset from the start of the first PF of the PF(s) associated with the PEI-O, provided by pei-FrameOffset in SIB1, and the offset is a symbol-level offset from the reference point to the start of the first PDCCH MO of this PEI-O, provided by firstPDCCH-MonitoringOccasionOfPEI-O in SIB1. If one PEI-O is associated with POs of two PFs, the two PFs are consecutive PFs calculated by the parameters PF_offset, T, Ns, and N. The details of the PEI may be found in 3GPP TS 38.304 and 3GPP TS 38.213.

Paging DRX is defined which requires the UE in the RRC_IDLE or RRC_INACTIVE state to monitor paging channels during one PO per DRX cycle. The following paging DRX cycles may be configured by the network: i) for CN-initiated paging, a default cycle is broadcast in system information, ii) for CN-initiated paging, a UE specific cycle can be configured via non-access stratum (NAS) signaling, iii) for RAN-initiated paging, a UE-specific cycle is configured via RRC signaling. The UE uses the shortest of the DRX cycles applicable. For example, a UE in RRC_IDLE may use the shortest of the first two cycles above, and a UE in RRC_INACTIVE may use the shortest of the three.

Recently, candidate technologies to support a low-power wake-up signal (LP-WUS) and a low-power wake-up receiver (LP-WUR) are under discussion in order to reduce power consumption of the UE.

A UE in RRC_IDLE/RRC_INACTIVE state should usually wake up at least once at every DRX cycle and receive signals, and this operation occupies a large portion of power consumption in a period during which there is no signaling or data traffic. If the UE is capable of receiving signals (e.g., performing paging reception) at a longer cycle rather than every DRX cycle (e.g., an N-th DRX cycle rather than every DRX cycle), power consumption may be significantly reduced. Such an operation may be supported by causing the LP-WUR to partially replace a signal reception operation that a main radio (MR) should perform and to operate with ultra-low power consumption.

As a technology similar thereto, a paging early indication (PEI) may be considered. The UE configured to receive the PEI may monitor only an occasion configured to receive the PEI, instead of every PO, in RRC_IDLE/RRC_INACTIVE state. Therethrough, the UE may reduce power consumption while maintaining standby mode until paging transmission from the BS is expected. Thereby, similar to receiving the LP-WUS, the UE may save power and increase a battery life thereof.

The UE configured to receive both the PEI and the LP-WUS may simultaneously receive signals from the MR and the LP-WUR, respectively. In this case, although, in some cases, the MR and the LP-WUR may lead to additional reduction of power consumption through respective complementary roles, in other cases, the MR may generate a situation of unnecessarily waking up the UE. For example, the LP-WUS, which has relatively narrow coverage, may be used when channel conditions are good, and the PEI may be used complementarily at a cell edge to reduce overall power consumption. However, the UE may wake up unnecessarily and power consumption of the UE may be increased due to a false alarm of the PEI or the LP-WUS or a time difference when the LP-WUS and the PEI having different cycles carry a wake-up message.

Hereinbelow, some implementations of the present disclosure regarding an LP-WUS reception method and procedure considering the PEI will be described so as to solve issues described above when the UE is configured to perform PEI monitoring and LP-WUS reception together.

Hereinafter, the main radio will be abbreviated as an MR, and the LP-WUR or low-power radio will be abbreviated as an LR, which follows terminology in standardization discussion related to the LP-WUS.

At the 3GPP standardization meeting, for discussion on the LP-WUS/LP-WUR, it was agreed to introduce an "ultra-deep sleep" power state, which is an ultra-low power consumption state of the MR. The "ultra-deep sleep" state was agreed to have a relative power of 0.015, similar to power off, as a starting point for discussion. This may be confirmed in tables below extracted from the agreements of the 3GPP standardization meeting RAN1 #110b-e. In this case, the relative power is a relative value set to 1 when the MR is in "deep sleep", and details thereof may be confirmed in 3GPP TR 38.840.

TABLE 11

| |
|---|
| Take the following power model for main radio for evaluation in LP-WUS/WUR SI, |
| For IoT and wearable cases, reuse TR38.875 power model as baseline. |
| For eMBB and other cases, reuse TR38.840 power model as baseline. |
| Introduce 'Ultra-deep sleep' power state for main radio of UEs with LP-WUS receiver |
| FFS: The details of 'Ultra-deep sleep' power state |

TABLE 12

The following power models are used 'Ultra-deep sleep' power state for main radio for evaluation

| Power State | Relative Power (unit) | Ramp-up and down transition energy (Note1): (unit multiplied by ms) | Ramp-up time | Time for sync/re-sync |
|---|---|---|---|---|
| Ultra-deep sleep | [0.015] | [2000~40000] Study to converge on candidate numbers to use for evaluation FFS: other values and reported by companies. FFS: down-selection of the values, companies are encouraged to provide details for down-selection | [400 ms], FFS: 100 ms | X |

Note1:
Ramp-up time may consist of the procedure for [main radio hardware tune on e.g., boot, memory load and etc.],
Time for sync/re-sync consists of the procedure for [main radio to resynchronization with the serving gNB etc.],
FFS: X and whether/how to have different values depending on other factors, e.g., signal-to-noise ratio
Companies can report the assumption of X in the initial evaluation.
Ramp up and down energy includes power for ramp-up and ramp-down. Energy consumption for sync/re-sync is separately calculated.
The total time for main radio transition from ultra-deep sleep to active/micro sleep state is the sum of ramp-up time and time for sync/re-sync.
FFS whether/how to define ramp-down time, whether to separately describe the ramp-down energy consumption
Note 2:
the power state transitions in this table refer to transitions between ultra deep sleep state and active/micro sleep state.
Note 3:
The values inside of '[ ]' are to be used as starting point of future study on LP-WUS Various scenarios and candidate technologies using the LP-WUS/LP-WUR are being discussed. As described above, as the MR is kept in a power-off state (or "ultra-deep sleep" state) for a long time, great gain may be obtained in terms of power saving. However, since the LP-WUS is expected to have lower coverage than an existing paging message, it is necessary to consider complementarily using the existing paging message and the PEI as well as radio resource management (RRM). To this end, as described above, an LP-WUS reception method and a selective LP-WUS reception method, considering the PEI, may be considered.

Hereinbelow, some implementations of the present disclosure regarding an LP-WUS reception operation based on the PEI preconfigured for the UE and on paging configuration will be described.

In general, it is expected that WUS reception using LR of the UE will have a lower level of power consumption than conventional paging message reception using the MR or selective paging monitoring using the PEI. However, depending on an LP-WUS channel and modulation method, and receiver design, the LP-WUS may support a lower size of data than the size of a conventional paging message and may be relatively vulnerable to a poor channel status. Hereinbelow, in order to compensate for these vulnerabilities of the LP-WUS, some implementations of the present disclosure will be described regarding a method and procedure for monitoring existing paging and PEI together with the LP-WUS. For example, some implementations of the present disclosure will be described below regarding a method and/or procedure for triggering the PEI or paging through the LP-WUS in order to cover a low bandwidth of the LP-WUS, causing the UE to selectively determine whether to receive the LP-WUS according to a channel status, and monitoring the PEI and paging in order to solve ambiguity and coverage issues that may occur during the selective determination. Additionally, in order to minimize power consumption, some implementations of the present disclosure are also described regarding a method and/or procedure for attempting to perform random access to the BS without monitoring the PEI and paging upon receiving the LP-WUS.

For a detailed description of a UE operation needed to receive the PEI and paging, reference is made to Clause 7 of 3GPP TS 38.304.

If the UE attempts to perform PEI/paging reception and random access in the MR through LP-WUS reception, switching from LR reception to MR transmission and reception is required. In the present disclosure, such switching between the MR and the LP-WUR is simply referred to as receiver switching.

While the present disclosure describes implementations of the present disclosure based on an NR system, the implementations of the present disclosure are not limited to the NR system unless stated otherwise. In addition, while some implementations of the present disclosure are described as examples based on the characteristics and structure of a DRX UE, the implementations of the present disclosure are not limited to supporting the DRX UE unless stated otherwise. Therefore, the implementations of the present disclosure may be applied to other wireless communication transmission/reception and services even when no separate description is given.

In the following description, each method, implementation, or option may be intended to clarify the description and it is not to be construed as implying that each method, implementation, or option should necessarily be implemented independently. For example, while each of methods/implementations/options described below may be implemented individually, at least some thereof may be implemented in combination as long as the methods/implementations/options do not conflict with each other.

A reception timing at which the UE receives the LP-WUS may be described separately in some implementations of the present disclosure below or may be determined based on system information sent by the BS. For example, when 1-bit information is capable of being received through the LP-WUS in one unit (e.g., one slot or one symbol) through on-off keying, an offset and a periodicity in a system frame may simply be configured. If decoded information is received through multiple on-off keying signals for reliability or if information containing two or more bits is received, a UE ID for a time period during which the UE receives the LP-WUS based on reception of the information and for the LP-WUR for verification after LP-WUS reception may reuse UE_ID used for reception of conventional paging, similarly to the PEI.

As another example, for LP-WUS reception, it may be considered that the UE derives a reception position of the LP-WUS through UE_ID given to the UE. For example, the LP-WUS may be repeated at a short periodicity, and the BS may provide the UE with a parameter regarding the number N_LP-WUSsubgroup of LP-WUS subgroups. This parameter means the number of LP-WUS monitoring occasions (MOs) required for one UE subgroup. In other words, the LP-WUS for one UE subgroup may be repeated in every corresponding LP-WUS MO. The UE may distinguish an LP-WUS MO to be monitored thereby through UE_ID given thereto among the N_LP-WUSsubgroup MOs. In addition, when K-bit information (e.g., K>2) is received through LP-WUS monitoring, the UE may also distinguish corresponding LP-WUS reception through UE_ID.

<Implementation 1> PEI Triggering Via LP-WUS

When the UE configured to monitor the PEI receives the LP-WUS through the LR, PEI monitoring may be triggered according to some implementations of the present disclosure. In this way, if the UE is capable of receiving the PEI by being triggered by the LP-WUS, the UE may perform PEI monitoring based on the LP-WUS. For example, if the UE is configured to monitor the LP-WUS as well as the PEI through an SIB, the UE may determine a PO of the PEI and not perform DCI monitoring in the PO. The UE may receive the nearest PO of the configured PEI (e.g., monitor a paging PDCCH in the PO) only after receiving a WUS of the BS through the LP-WUS.

After the UE receives the LP-WUS, it may take time to perform receiver switching required for PEI monitoring. To ensure this time and minimize a delay time needed from LP-WUS reception to PEI monitoring, some implementations of the present disclosure may align an LP-WUS monitoring timing with the PO of the PEI. For example, the UE may receive a time interval T between the LP-WUS monitoring timing and a PEI monitoring timing, which is configured from the SIB through higher layer signaling of the BS, particularly, through system information such as the SIB. In some implementations, the time interval T may be the number of slots or the number of symbols based on numerology (e.g., SCS) of the MR or may be a time value such as msec. Through the time interval T, the UE may attempt to receive the LP-WUS at a time earlier by T than every PO of the configured PEI. For example, the UE may be specified to always have an LP-WUS MO at a timing separated by a certain interval from the PO of the configured PEI.

Conversely, occurrence of the PO of the PEI in accordance with a configured LP-WUS MO may be considered. The UE may receive the time interval T between the LP-WUS monitoring timing and the PEI monitoring timing, configured through higher layer signaling of the BS, especially, through the system information such as the SIB. In this case, the UE may infer a PO triggered through the LP-WUS through the time interval T based on a slot in which the LP-WUS is received. For example, the UE may assume that a specific PDCCH MO occurs in a slot or symbol separated by the predetermined time interval T from the slot in which LP-WUS is received.

To this end, the UE may additionally receive a PEI configuration regarding a search space of the PEI that the UE may receive after receiving the LP-WUS. As an example, at least one of the following RRC parameters may be additionally configured for the UE by the BS.

Figure 13:
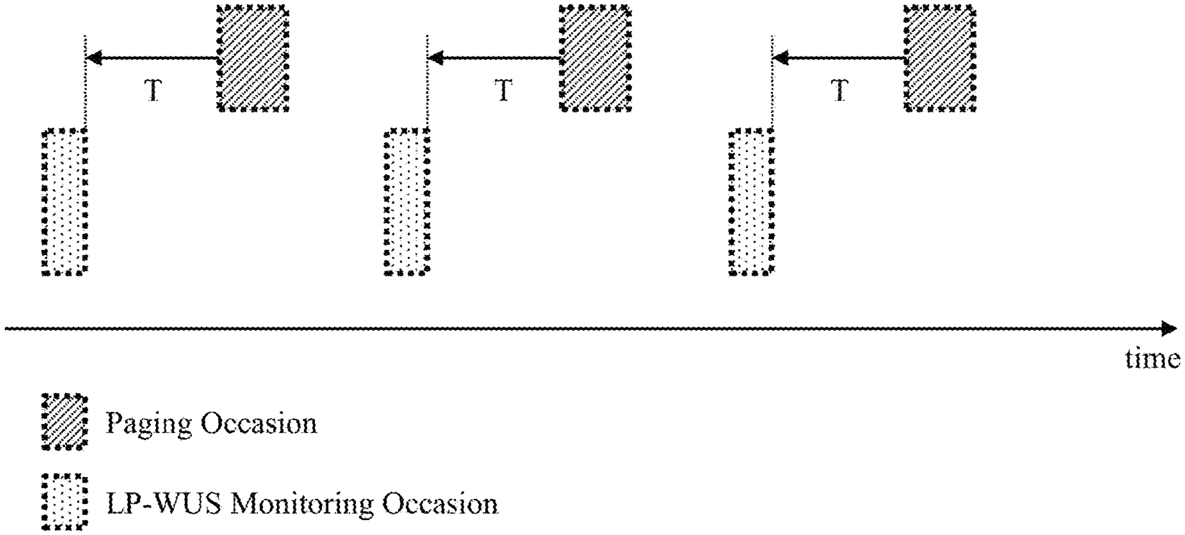
FIGS. 13 to 15 illustrate examples of LP-WUS monitoring occasions (MOs) and paging occasions (POs) according to some implementations of the present disclosure.
Figure 14:
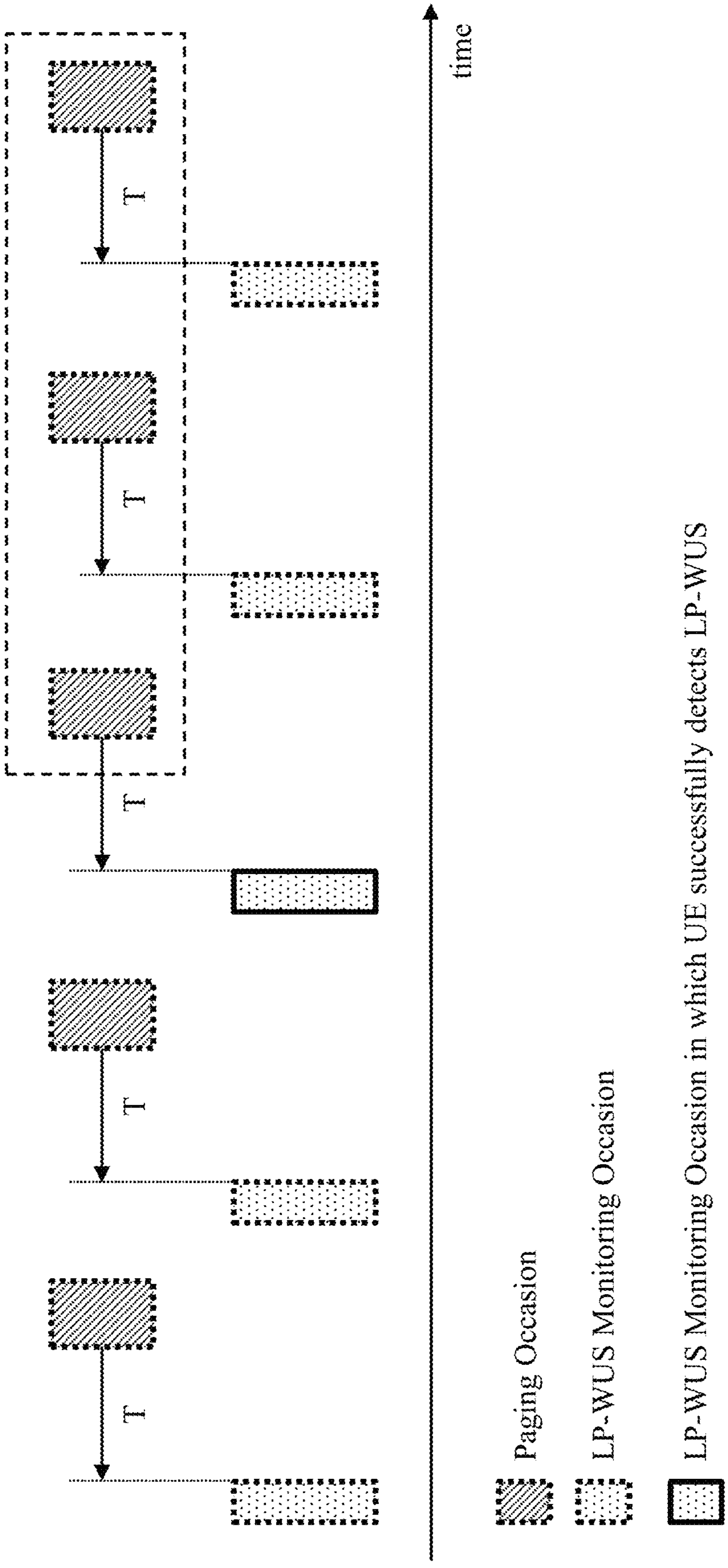
Figure 15:
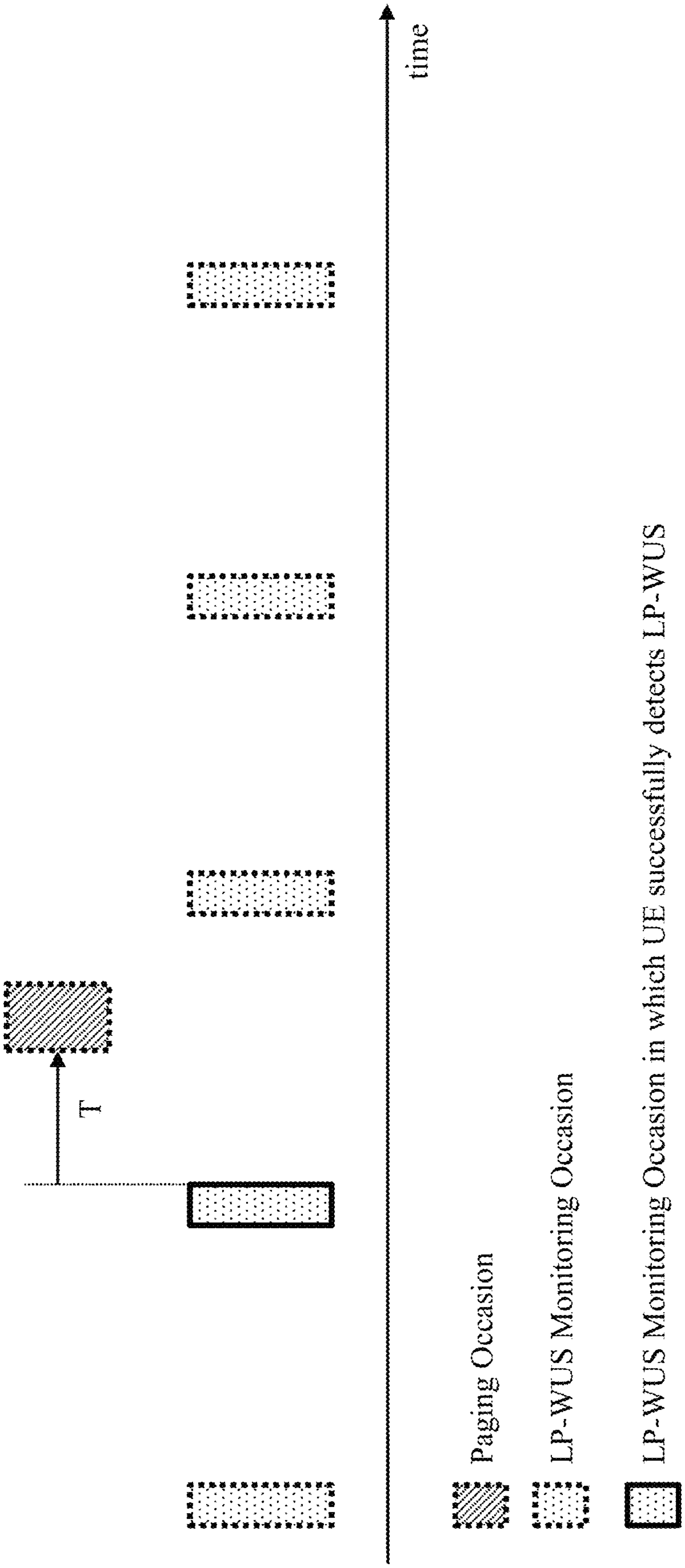

- pei-SearchSpace: ID of search space for PEI
- pei-FrameOffset: Offset, in number of frames from the start of a reference frame for PEI-O to the start of a first paging frame of the paging frames associated with the PEI-O
- firstPDCCH-MonitoringOccasionOfPEI-O: Offset, in number of symbols, from the start of the reference frame for PEI-O to the start of the first PDCCH monitoring occasion of PEI-O on a BWP
- nrofPDCCH-MonitoringOccasionPerSSB-InPO: The number of PDCCH monitoring occasions corresponding to an SSB within a Paging Occasion <Implementation 2> Paging Triggering Via LP-WUS FIGS. 13 to 15 illustrate examples of LP-WUS MOs and POs according to some implementations of the present disclosure. In some implementations of the present disclosure, POs and LP-WUS MOs may be configured in the same frequency band, or may be configured in different frequency bands.

When the UE configured to monitor the PEI receives the LP-WUS through the LR, PDCCH monitoring of the BS for paging may be triggered according to some implementations of the present disclosure. That is, the UE may attempt to receive paging through the LP-WUS separately from (or simultaneously with) attempting to receive paging through the PEI.

It may be considered that the UE continuously receives a paging signal for a predetermined time after receiving the LP-WUS. This is because not only may the UE fail to receive paging from the nearest PO, but also an unnecessary delay time may occur due to sleep state transition when the UE needs to wake up again in the future. The predetermined time may be provided through higher layer signaling of the BS, especially, the system information, together with an LP-WUS reception configuration, or may be a predefined time length. If the UE does not immediately transition to ultra-deep sleep upon failing to receive paging in attempting to receive paging after successful LP-WUS reception, the power consumption of the UE may increase. Accordingly, it may be considered to maintain a light/deep sleep state or a wake-up state for the predetermined time and then transition to a deep and/or ultra-deep sleep state. In this case, the power consumption of the UE may be minimized while reducing a time required for sleep state transition upon receiving an additional LP-WUS or PEI.

After the UE receives the LP-WUS, receiver switching required for direct paging PDCCH monitoring may require time. To guarantee this time and minimize a delay time required from LP-WUS reception to paging PDCCH monitoring, some implementations of the present disclosure may align an LP-WUS monitoring timing with a PO. For example, the UE may receive a time interval T between an LP-WUS monitoring timing and a paging PDCCH monitoring timing configured through higher layer signaling of the BS, particularly, through system information such as an SIB. Referring to FIG. 13, through the time interval T, the UE may attempt to receive the LP-WUS at a time earlier by T than every configured PO. For example, the UE may be specified to always have an LP-WUS MO at a timing separated by a predetermined interval from the PO of a configured PEI. As illustrated in FIG. 13, when the UE attempts to receive the LP-WUS at a timing earlier than every configured PO by T, the BS needs to signal only the time interval T to the UE, so that the LP-WUS MO may be configured with less signaling overhead.

In some implementations of the present disclosure, a plurality of LP-WUS MOs may be present at a certain time interval at timings earlier than POs by T or may be given as a certain time range due to characteristics of the LP-WUS receiver. If the time range is given, the UE may arbitrarily attempt to receive the LP-WUS multiple times within that range.

When the UE attempts to receive a paging message in a PO after successfully receiving the LP-WUS, the BS may fail to immediately transmit the paging message to the UE. In such a case, in order to prevent the UE from entering a sleep state again, in some implementations, referring to FIG. 14, it may be considered that the UE repeatedly receives the PO for a predetermined time (e.g., attempt to repeatedly receive a paging PDCCH in POs within a certain duration) upon succeeding in receiving the LP-WUS. For example, the UE may receive a near PO assigned thereto N times, receive a near paging frame assigned thereto M times, or attempt to receive paging in a PO included in a predetermined time K. Here, N, M, and K may be predefined values, values preconfigured for the UE through higher layer signaling, values transmitted through an SIB/MIB, or values determined through LP-WUS transmission and reception.

In contrast, in some implementations of the present disclosure, it may be considered to generate an arbitrary paging PDCCH MO according to a configured LP-WUS MO. The UE may receive the time interval T between the LP-WUS monitoring timing and the arbitrary paging PDCCH monitoring timing configured through higher layer signaling of the BS, especially, through system information such as the SIB. In this case, the UE may infer a PO triggered by an LP-WUS through the time interval T in a slot in which the LP-WUS is received. For example, referring to FIG. 15, the UE may assume that a specific PDCCH MO occurs in a slot or symbol separated by the predetermined time interval T from the slot in which the LP-WUS is received. For example, the UE may assume that a radio frame at a timing separated by the predetermined time interval T from the slot in which the LP-WUS is received is a paging frame. That is, the location of the paging frame may not be determined based on a UE ID, a paging DRX cycle, or a paging frame, but may be determined based on an LP-WUS reception location. The UE that has successfully received the LP-WUS in the LP-WUS MO may receive the paging PDCCH in a PO within the corresponding paging frame (PF). As another example, in order to infer a specific PO triggered by a certain LP-WUS, the UE may assume that a slot separated by the predetermined time interval T from the slot in which the LP-WUS is received is a slot in which the PO exists. In this case, PO reception within the slot may use the location of the PDCCH MO within a slot determined by conventional pagingSearchSpace. That is, the UE may receive the paging PDCCH in a slot determined as an LP-WUS reception timing by assuming the same location as a location within a slot of a conventional PO.

pagingSearchSpace, which is to be used in a specific PDCCH MO occurring in a slot or symbol separated by the predetermined time interval T from a slot in which the LP-WUS is received, may be separately configured for the UE. Here, the RRC parameter pagingSearchSpace may provide an ID of a search space for paging. The search space may be given by a separate search space configuration except a periodicity and an offset, and the UE may determine a timing at which the corresponding search space occurs based on an LP-WUS reception timing in units of slots or system frames. If the search space is determined in units of system frames, a separate slot offset may be derived based on a UE-ID or information configured for the search space. For example, a separate parameter indicating a slot in which a PO exists within a system frame may be configured. Alternatively, (slot length from SFN0 to LP-WUS reception timing+T) mod (slot length of LP-WUS periodicity) may be defined as the slot offset. Alternatively, the periodicity and offset may be configured, and it may be assumed that a PDCCH occurs from a determined system frame other than SFN0. The UE may ignore a periodicity/offset-related configuration among conventional PO configurations (e.g., search space configurations for paging), and the BS may override the periodicity/offset-related configuration through LP-WUS transmission. In some implementations, symbol(s) and a duration of the search space for paging may be determined according to the conventional PO configuration. While a conventional PO has a constraint that multiple UEs should be capable of receiving the paging PDCCH, the BS may freely configure a PO based on LP-WUS as compared with the conventional PO because there is no risk of the UE that is not the target of the LP-WUS misunderstanding the PO generated based on the LP-WUS according to some implementations of the present disclosure.

Alternatively, in some implementations, it may be assumed that the UE uses pagingSearchSpace, which is the same as that conventionally used, in a specific PDCCH MO occurring in a slot or symbol separated by the predetermined time interval T from the slot in which the LP-WUS is received. For example, the UE may determine only a random paging frame separated by the predetermined time interval T from an LP-WUS reception timing based on the LP-WUS reception timing and determine PO(s) in the paging frame as described in 3GPP TS 38.304.

Even when the UE receives a paging PDCCH in any paging PDCCH MO generated according to an LP-WUS MO, the BS may fail to immediately transmit a paging message to the UE. In such a case, in order to prevent the UE from entering a sleep state again as described above, it may be considered that the UE repeatedly receives a PO (i.e., monitor the PO) for a certain time upon successful LP-WUS reception. For example, when LP-WUS reception is successful, it may be assumed that all frames within a predetermined time K from a slot separated by the predetermined time interval T from a slot in which the LP-WUS is received are paging frames. For example, it is assumed that the earliest PO and/or PF after a timing separated by the predetermined time interval T after any LP-WUS MO is a PO and/or PF associated with the LP-WUS MO, the UE may attempt to receive a PDCCH in the associated PO and/or PF if LP-WUS reception/detection is successful in the WUS MO.

The predetermined time interval T and the predetermined time K may be predefined values, values preconfigured for the UE through higher layer signaling, values transmitted through the SIB/MIB, or values determined through LP-WUS transmission and reception.

In some implementations of the present disclosure, the case in which paging is triggered through the LP-WUS and a PEI configuration as well as an LP-WUS is provided through the system information, in other words, the UE receives a PEI monitoring configuration and an LP-WUS monitoring configuration at the same time, may be considered. To reduce unnecessary power consumption in this case, at least one of methods below may be considered.

- Method 1: If the UE is capable of receiving the LP-WUS, the UE ignores the PEI configuration and does not receive PEI. Alternatively, the UE does not perform paging monitoring according to the corresponding PEI.
- Method 2: If the UE is capable of receiving the LP-WUS, the UE preferentially receives the LP-WUS and receives the PEI only when the LP-WUS is not received. Therethrough, the UE may receive the PEI only when LP-WUS reception is not possible, and thus, additional power consumption reduction is anticipated. For example, the UE may not receive the PEI for a certain time after an LP-WUS MO. In this case, the certain time may be a time required for receiver switching or may be a time length derived through a value related to receiver switching. For this purpose, the certain time may use a predetermined value or may be provided through L1 signaling (e.g., DCI) or higher layer signaling (e.g., RRC signaling) of the BS.

<Implementation 3> Random Access Attempt Through LP-WUS

An operation in which the UE attempts to perform random access when the UE receives the LP-WUS through the LR is proposed. That is, upon receiving a wake-up message for the MR of the UE through the LP-WUS, the UE may trigger random access without receiving a separate PEI/paging. This may be useful when the bandwidth of the LP-WUS and the size of transmittable information are sufficiently wide to wake up UEs individually.

When using Implementation 3, the LP-WUS may operate independently of PEI and paging configurations. For example, the UE may attempt to receive the PEI and paging regardless of whether the UE has received the LP-WUS and may receive the LP-WUS through the LR regardless of whether PEI and paging reception is successful.

As another example, when using Implementation 3, the UE may perform random access without receiving paging through the LP-WUS. In this case, the UE may additionally reduce power consumption by not performing PEI/paging reception in an LP-WUS reception occasion. For example, the UE may not receive the PEI/paging for a predetermined time after an LP-WUS MO. In this case, the predetermined time may be a time required for receiver switching or may be a time length derived through a value related thereto. For this purpose, the predetermined time may use a predetermined value or may be provided through L1 signaling (e.g., DCI) or higher layer signaling (e.g., RRC signaling) of the BS.

<Implementation 4> Method of Changing LP-WUS UE Operation

The effects of Implementation 1/Implementation 2/Implementation 3 described above may vary depending on various factors such as situations of the UE and BS and the number of UEs receiving the LP-WUS. Therefore, in some implementations of the present disclosure, Implementations 1/2/3 may be selected depending on situations. Therethrough, the UE may use one having the greatest effect among Implementations 1/2/3, which may result in additional power consumption reduction or delay time reduction.

The following alternatives may be considered to determine whether to receive the LP-WUS and determine a UE operation upon receiving the LP-WUS.

- Alt. 1: The BS may configure one of Implementation 1, Implementation 2, and/or Implementation 3 through an RRC configuration. For example, BS may:
  - configure use of one of implementations 1, 2, and/or 3 through an SIB message or other broadcast messages, or
  - preconfigure a UE operation in an RRC_CONNECTED state when the UE transitions to RRC_IDLE/RRC_INACTIVE.
    - In some implementations, this may be performed by the UE through a request to the BS through UCI in the RRC_CONNECTED state.
    - In some implementations, this may be limited to the case in which the UE monitors the LP-WUS in the RRC_CONNECTED state. This is for the UE to obtain information about an LP-WUS reception capability and select one of Implementations 1, 2, and/or 3 based on the information.
- Alt. 2: Information included in the LP-WUS may indicate the UE operation after LP-WUS reception.
- For example, LP-WUS information received by the UE may be divided into two parts: a header and a payload.
  - The header may contain at least one of the following information:
    - The header may indicate a necessary UE operation when the UE receives the LP-WUS.

The header may include a symbol length (i.e., number of symbols) of a payload channel through which the UE will receive the LP-WUS.

Based on the header, the number of symbols per unit information of the payload channel to be received by the UE may be determined. That is, the number of symbols used in the unit information of the payload channel may be determined according to header information. For example, if the unit information is one bit, the number of symbols used to receive one bit may be indicated in the header. When transmitting the payload channel, the BS may transmit information by modulating the unit information. For example, in the case of a 16-QAM signal, 4 bits are expressed in one symbol as the unit information. The unit information may vary depending on a modulation order and even on a CRC. If the BS collects data of a certain size during LP-WUS transmission and adds parity bits for FEC, more symbols may be required per unit data used for coding.

The header may indicate a modulation order of the payload channel to be received by the UE.

The payload may include UE_ID or information scrambled with UE_ID so as to confirm which UE is a target to which the LP-WUS is transmitted.

As another example, the LP-WUS information received by the UE may be divided into two parts: a header and a payload of another scheme.

The header may include a (1-bit) indicator indicating whether the payload changes an operation scheme of the LP-WUS or delivers the WUS.

If the header indicates that the operation scheme of the LP-WUS is changed, one of Implementations 1, 2, and/or 3 or other UE operations may be indicated through a few MSBs of the payload. This may be applied to all UEs receiving/monitoring a corresponding LP-WUS MO.

If the header indicates delivery of the WUS, the payload may include UE_ID or information scrambled with UE_ID to identify to which UE the LP-WUS is transmitted. The UE that has received UE_ID thereof or the UE that has received information scrambled with UE_ID may operate according to the last received LP-WUS operation scheme.

Alt. 3: The UE may select an LP-WUS operation depending on a capability thereof and on whether there is a PEI configuration.

Case in which the PEI is configured for the UE (e.g., case in which the BS provides the PEI configuration)

The UE uses an implementation that the UE is capable of supporting among Implementation 1 and Implementation 3. If the UE supports both implementations, the UE may use Implementation 3.

Case in which the PEI is not configured for the UE (e.g., case in which the BS does not provide the PEI configuration)

The UE uses an implementation that the UE is capable of supporting among Implementation 2 and Implementation 3. If the UE supports both implementations, the UE may use Implementation 3.

Alt 4: The UE may determine whether to attempt to receive the LP-WUS or attempt to receive a conventional PEI/paging in consideration of reception possibility or reliability of the LP-WUS.

For example, the UE may determine whether to attempt to receive the LP-WUS based on the received power of the LP-WUS. If the received power of the LP-WUS is lower than a certain threshold power, the UE may assume that it is difficult to properly receive the LP-WUS and may receive the PEI/PO after performing receiver switching.

In this case, the UE may attempt to monitor a PDCCH in all configured PEIs or POs (if the PEI is not configured) without considering Implementations 1, 2, and/or 3 described above.

Implementation 5 may be considered to determine the threshold power.

<Implementation 5> Method of Determining Threshold Received Power of LP-WUS

If a wake-up operation is performed depending on the LP-WUS, the reception reliability of the LP-WUS may be more important. Therefore, the UE may continuously determine the reception reliability of the LP-WUS. If reliability is decreased, a conventional operation to monitor the PEI or the PO may be necessary as in Alt. 4 of Implementation 4. In this case, at least one of the following alternatives may be used to determine the reception reliability of the LP-WUS.

Alt. 1: The BS may maintain an average power of an LP-WUS band at a certain level or more regardless of whether the WUS is transmitted. For example, the BS may transmit dummy information that the UE may continuously receive the LP-WUS on a time/frequency radio resource used for LP-WUS transmission when separate WUS transmission is not necessary. Therethrough, when a UE requiring WUS transmission occurs, the WUS may be continuously transmitted on the time/frequency radio resource used for LP-WUS transmission and, otherwise, a dummy signal of the BS may be continuously transmitted on the corresponding resource. The UE may infer the transmission power of the BS through the LP-WUR on the corresponding radio resource and perform synchronization for receiving the LP-WUS. In some implementations, if the received power is below a threshold received power configured by the BS through higher layer signaling (e.g., RRC signaling) or based on the capability of the UE, the UE may stop attempting to receive the WUS through the LP-WUS as in Alt. 4 of Implementation 4. In some implementations, the UE may resume attempting to receive the WUS through the LP-WUS if the received power is greater than the threshold received power configured by the BS through higher layer signaling or based on the capability of the UE.

Alt. 2: Whether to receive the LP-WUS may be determined based on the received power of a separate reference signal configured by the BS for transmission. For example, the separate reference signal (hereinafter referred to as LP-SS) configured by the BS for LP-WUS reception or a reference signal used for MR reception (e.g., a PSS/SSS or a CSI-RS/tracking reference signal (TRS)) may be considered. In some implementations, if the received power is below the threshold received power configured by the BS through higher layer signaling or based on the capability of the UE, the UE may stop attempting to receive the WUS through the LP-WUS as in Alt. 4 of Implementation 4. In some implementations, if the received power is greater than the threshold received power configured by the BS through higher layer signaling or based on the capability of the UE, the UE may resume attempting to receive the WUS through the LP-WUS. For example, the UE may measure an RSRP of an LP-WUS specific signal such as the LP-SS (e.g., a reference signal configured for the LP-WUS). In this case, the UE may compare the measured RSRP value of the LP-SS with an RSRP threshold of the LP-SS configured through higher layer signaling or based on the capability of the UE and may stop attempting to receive the WUS through the LP-WUS as in Alt. 4 of Implementation 4.

<Implementation 6> Dynamically Changeable LP-WUS Reception Operation of UE

A method of receiving the LP-WUS of the UE and an operation after reception may be changed using Implementation 4 described above. Other modification method(s) not described in Implementation 4 will now be described herein. The following may be considered to change the operation of the UE.

Alt. 1:

The UE may determine an operation thereof based on two or more LP-WUS receptions.

In some implementations, for this purpose, two or more LP-WUS MOs may be configured for the UE. If the UE receives the LP-WUS in the LP-WUS MO of the first configuration, the UE may attempt to receive the LP-WUS in the LP-WUS MO of the second configuration by a predetermined number of times or for a predetermined period. If LP-WUS reception is successful in the LP-WUS MO of the second configuration, the UE may attempt to perform random access after receiving the LP-WUS using Implementation 3 or a method similar thereto. Upon failing to receive the LP-WUS in the LP-WUS MO of the second configuration, the UE may attempt to receive a PO or a PEI using Implementation 1 or 2 or a method similar thereto.

In some implementations, for this purpose, two or more LP-WUS MOs may be configured for the UE. The LP-WUS configurations may include a first type LP-WUS configuration used standalone and a second type LP-WUS configuration used dependently on other LP-WUS receptions that are different from the first type LP-WUS configuration. In the case of the second type LP-WUS configuration, there is a paired first type LP-WUS configuration, and the UE may use the second type LP-WUS through the paired LP-WUS configuration only upon succeeding in receiving the LP-WUS.

When the second type LP-WUS configuration is used, the paired first type LP-WUS configuration may not be used for a certain time period. This may be interpreted as the UE transitioning for a certain time period to a state using the second type LP-WUS configuration when LP-WUS reception is successful in the first type LP-WUS configuration.

Different reception methods may be used in the first type LP-WUS configuration and the second type LP-WUS configuration. For example, different UE-IDs may be used in the two LP-WUS configurations, or reception success or failure may be determined using different methods. For example, if a UE-ID such as "5G-S-TMSI mod N" is used in the first type LP-WUS configuration, a UE-ID such as "5G-S-TMSI mod M" may be used in the second type LP-WUS configuration, where M is greater than N. As another example, if a UE index i_u transmitted for LP-WUS reception is determined using constants N and Ns as a scheme such as "i_u=floor (UE_ID/N) mod Ns", the constants N and Ns may be determined differently with respect to the first type LP-WUS configuration and the second type LP-WUS configuration. As an example, a smaller N or a smaller N and a larger Ns may be used for the second type LP-WUS configuration.

Alt. 2:

The UE may receive two or more LP-WUS configurations and perform a different UE operation for each LP-WUS configuration. For example, the UE may attempt to receive a PO or a PEI after successfully receiving the LP-WUS through the first LP-WUS configuration. As another example, the UE may attempt to perform random access after successfully receiving the LP-WUS through the second LP-WUS configuration. If MOs of the two LP-WUS configurations overlap in time, the UE may prioritize the first LP-WUS configuration in order to prevent a false alarm. As another example, if the MOs of the two LP-WUS configurations overlap in time, the UE may prioritize the second LP-WUS configuration in order to reduce latency.

Alt. 3: Information included in the LP-WUS may indicate a UE operation after receiving the LP-WUS.

For example, LP-WUS information received by the UE may be divided into two parts: a header and a payload. As another example, the structure of an LP-WUS channel received by the UE may be divided into two parts: a header and a payload.

The header may include at least one of the following information.

The header may indicate a necessary UE operation when the UE receives the LP-WUS. For example, whether to perform random access or attempt to receive the PO/PEI may be indicated through one bit.

The header may include a symbol length of a payload channel through which the UE is to receive the LP-WUS.

The number of symbols per unit information of the payload channel to be received by the UE may be determined based on the header. For example, if the unit information has one bit, the number of symbols used to receive the one bit may be indicated through the header.

The header may indicate a modulation order of the payload channel to be received by the UE. This may be used when the header and payload are delivered through different baseband processing, for example, when the payload is delivered by an OFDMA scheme and the header is delivered by an on-off keying scheme.

The payload may include UE_ID or information scrambled with UE_ID so as to confirm which UE is a target to which the LP-WUS is transmitted.

The UE may interpret the payload information based on the received header information and determine the UE operation after LP-WUS reception in a manner described in the header.

<Implementation 7> Fallback Operation when UE Fails to Receive LP-WUS

If the UE fails or continues to fail to receive the LP-WUS, the UE operation may be changed as follows.

When the UE is configured to attempt to perform random access after receiving the LP-WUS, or the UE determines to perform such an operation, if the UE fails to receive the LP-WUS N times in succession in configured LP-WUS MOs or fails to receive the LP-WUS for a predetermine time T or more, the UE may perform the following operation.

If the UE is capable of determining whether the LP-WUS is transmitted using Implementation 5 described above or a method similar thereto, the UE may attempt to perform random access when it is determined that the UE has failed to receive the LP-WUS because the BS does not transmit the LP-WUS.

The UE may maintain a current UE operation when it is determined that the BS has transmitted the LP-WUS but the UE has failed to receive the LP-WUS.

If the UE is incapable of determining whether the LP-WUS is transmitted using Implementation 5 described above or a method similar thereto, the UE may maintain the current UE operation.

When the UE is configured to attempt to receive the PO or the PEI after receiving the LP-WUS, or the UE determines to perform such an operation, if the UE fails to receive the LP-WUS N times in succession in configured LP-WUS MOs or fails to receive the LP-WUS for a predetermine time T or more, the UE may perform the following operation.

If the UE is capable of determining whether the LP-WUS is transmitted using Implementation 5 described above or a method similar thereto, the UE may attempt random access if it is determined that the UE has failed to receive the LP-WUS because the BS does not transmit the LP-WUS. Alternatively, the UE may attempt to receive the PO or the PEI if it is determined that the UE fails to receive the LP-WUS because the BS has not transmitted the LP-WUS.

The UE may maintain the current UE operation if it is determined that the BS has transmitted the LP-WUS but the UE has failed to receive the LP-WUS.

If the UE is incapable of determining whether the LP-WUS is transmitted using Implementation 5 or a method similar thereto, the UE may attempt to receive the PO or the PEI or attempt to perform random access. As another example, the UE may first attempt to receive the PO or the PEI and attempt to perform random access if the UE fails to receive the PO/PEI by a certain number of times or for a certain period.

<Implementation 8> WUS Information in LP-WUS

When the BS wakes up the UE by transmitting the LP-WUS and triggers attempting to receive the PO or perform random access, an LP-WUS message may include one or more LP-WUS records that include a UE ID, a UE group ID, or a UE subgroup ID, similar to a paging message delivered through a PDSCH scheduled by a paging PDCCH. If the same record as the UE ID, the UE group ID, or the UE subgroup ID, which is preconfigured or is derived from a preconfigured UE ID, is included in the LP-WUS message after receiving the LP-WUS message, the UE may attempt to receive the PO (i.e., monitor the PO) or perform random access.

In order to deliver a clearer message to the UE, a method of including a cell ID or a tracking area ID in the LP-WUS may be considered. The network/BS may transmit the cell ID and/or tracking area ID through the LP-WUS, so that the UE may determine a current cell location and/or tracking area location through LP-WUS reception. In this case, at least one of the following methods may be considered.

Method 1: If a cell ID and/or tracking area ID that the UE has last received through an LP-WUS and/or paging configuration and a cell ID and/or tracking area ID included in the LP-WUS message are the same (hereinafter, condition 1) or different (hereinafter, condition 2), the UE may perform the following operation.

Method 1-1: In condition 1, the UE may attempt to receive a paging PDCCH after receiving the LP-WUS, and in condition 2, the UE may attempt to perform random access after receiving the LP-WUS. This may be useful when UE-specific paging PDCCH reception is required after LP-WUS reception.

Method 1-2: In condition 1, the UE may attempt to receive configured first PO(s) (i.e., monitor the first PO(s)) after receiving the LP-WUS, and in condition 2, the UE may attempt to receive separately configured second PO(s) after receiving the LP-WUS. The first PO(s) may be PO(s) configured for each UE, UE group, or cell or may be PO(s) determined based on an LP-WUS configuration. The second PO(s) may be PO(s) commonly used for the UE group or for the UE in a cell unit.

<Implementation 9> Payload Saving of LP-WUS

When the BS wakes up the UE by transmitting the LP-WUS and triggers attempting to receive the PO or perform random access, the LP-WUS message may include one or more LP-WUS records that include a UE ID, a UE group ID, or a UE subgroup ID, similar to the paging message delivered through the PDSCH scheduled by the paging PDCCH. If the same record as the UE ID, the UE group ID, or the UE subgroup ID, which is preconfigured or is derived from a preconfigured UE ID, is included in the LP-WUS message after receiving the LP-WUS message, the UE may attempt to receive the PO (i.e., monitor the PO) or perform random access.

In order to reduce power consumption, it is important to reduce unnecessary waking up of the UE. To this end, it is necessary to sufficiently reduce the granularity of the UE ID, UE group ID, or UE subgroup ID included in the LP-WUS message. However, increasing information size of the ID may reduce the reliability of the LP-WUS message itself. Therefore, a method to increase the amount of information in the LP-WUS message is needed without increasing the payload size of a single LP-WUS message. For this purpose, at least one of the following may be considered.

Method 1: The UE may derive and use a new ID by adding a value to the UE ID, the UE group ID, or the UE subgroup ID depending on an LP-WUS reception timing. For example, when an index of a slot in which the LP-WUS is received is T, a value of (T mod N) may be an additional ID. The UE may concatenate the additional ID to an ID included in the LP-WUS message to derive a final UE ID, UE group ID, or UE subgroup ID. Here, N may be a value given through higher layer signaling of the BS or a predefined value (e.g., 128). The additional ID may be used to control a false alarm of the LP-WUS by grouping UEs that wake up through the LP-WUS. For example, even if a UE ID is included in a message, the UE may not wake up if no additional ID is included. In other words, the UE may attempt to receive the LP-WUS only upon receiving the LP-WUS that includes an ID thereof as the additional ID.

Method 2: The UE may vary an interpretation method of the LP-WUS message depending on an LP-WUS reception timing.

Method 2-1: An LP-WUS message received at a specific timing may not include the UE ID, the UE group ID, or the UE subgroup ID and may mean change of system information and/or earthquake and tsunami warning system (ETWS)/commercial mobile alert system (CMAS) information or include tracking area information and radio access network (RAN) area information. For this purpose, the LP-WUS message may include short message(s) such as DCI format 0_1 with a P-RNTI (i.e., DCI Format 0_1 with a CRC scrambled with the P-RNTI).

Method 2-2: For a complementary operation to Method 2-1, a 1-bit flag indicating a method of interpreting the LP-WUS message may be included in an MSB or a least significant bit (LSB) of the LP-WUS message. Depending on the value of the corresponding one bit, the UE may interpret the LP-WUS message as a change in the system information and/or the ETWS/CMAS information, as a short message indicating the tracking area information and the RAN area information, or as the UE ID, the UE group ID, or the UE subgroup ID.

Method 3: Multiple LP-WUS messages may be used. In this case, an LP-WUS received at a specific timing or in consecutive time units may mean one piece of information, or the first LP-WUS reception may include the UE group ID, and the second LP-WUS reception may include a UE ID within a group.

Method 3-1: For a complementary operation to Method 2-1, a 1-bit flag indicating the order of the LP-WUS message may be included in the MSB or LSB of the LP-WUS message. According to a transmission order indicated in the LP-WUS message, the UE may concatenate and use successively received LP-WUS messages or determine a method of interpreting the corresponding LP-WUS message, for example, whether to interpret the LP-WUS message as the UE group ID or a UE ID in the group.

<Method 10> Method of Receiving PDCCH after LP-WUS Detection

If the BS wakes up the UE by transmitting the LP-WUS using Implementation 1 and/or Implementation 2 of the present disclosure or a method similar thereto, and the UE, after receiving and detecting the LP-WUS, receives a PDCCH in a separate PO corresponding to an LP-WUS reception location (hereinafter referred to as a first type PO), the UE may perform an operation, an operation different from an operation in a conventional PO (hereinafter referred to as a second type PO) in the corresponding PO. For example, the first type PO may be a PO monitored by LP-WUS reception, a PO determined based on a relative position in time to the LP-WUS reception timing or an LP-WUS MO location, a PO determined based on RRC parameter(s) given for LP-WUS reception, a PO at a location derived based on information included in the LP-WUS message, or a PO used by the UE to receive a PDCCH and detect DCI using a specific RNTI associated with LP-WUS configuration. For example, the second type PO may be a PO derived based on the parameter pagingSearchspace provided through the SIB, as described in Section 7 of 3GPP TS 38.304. The UE may perform at least one of the following operations in the first type PO.

Operation 1: The UE may receive the PDCCH by assuming a separate DCI format used in the first type PO. The DCI format may indicate a UE operation (e.g., RACH attempt or PDSCH reception) after DCI reception or include a specific UE ID, UE group ID, or UE subgroup ID for which RACH attempt is required.

Operation 2: The UE may always assume the first type PO or the second type PO when the first type PO and the second type PO overlap. For example, after detecting the LP-WUS, the UE may always assume the first type PO in order to receive a DCI format transmitted by the BS to the UE that has detected the LP-WUS. Alternatively, a second type PO may be assumed for compatibility with a conventional UE operation.

Operation 3: The UE may use a different RNTI in each PO in order to distinguish between the first type PO and the second type PO. As an example, the UE may attempt to receive paging DCI, e.g., DCI format 1_0 with a CRC scrambled with the P-RNTI (i.e., perform blind decoding) in the second type PO and attempt to receive LP-WUS DCI, e.g., DCI format 1_0 with a CRC scrambled with an LR-RNTI (i.e., perform blind decoding) in the first type PO. The LP-RNTI may be a separate RNTI given through LP-WUS configuration or an RNTI derived from the P-RNTI.

As described above, the first type PO may be determined separately from the LP-WUS reception timing. In this case, the UE may attempt to receive the PDCCH in the first type PO or attempt to receive the PDCCH in the second type PO depending on a reception timing after successfully receiving and detecting the LP-WUS. This PO type may be considered as a piece of information and this information may be used to stop receiving the LP-WUS. For example, the UE may perform the following operations depending on the PO type according to LP-WUS detection.

LP-WUS reception may be deactivated depending on the PO type attempting to receive the PDCCH. A UE for which LP-WUS reception is deactivated does not attempt to receive the LP-WUS any more. LP-WUS reception may be resumed (activated) in the future through network connection in a conventional PO or through SIB or MIB reception.

For example, for compatibility with legacy UEs, the UE may deactivate LP-WUS reception when the BS instructs the UE to receive the LP-WUS in the second type PO. Alternatively, if the first type PO is configured with a long period for this purpose and if the BS instructs the UE to receive the PDCCH in the first type PO (i.e., the UE attempts to receive the PDCCH in the first type PO after receiving the LP-WUS), LP-WUS reception may be deactivated.

To deactivate LP-WUS reception, the UE may use PDCCH information received in the PO. For example, when the BS configures or directs the LP-WUS to receive the PDCCH in the first type PO (i.e., when the UE attempts to receive the PDCCH in the first type PO after receiving the LP-WUS), the UE may receive DCI and receive a PDSCH through the DCI by assuming a DCI format and/or a paging message that includes information as to whether or not the LP-WUS is deactivated. If the DCI format or the paging message includes a DCI field value or RRC parameter value indicating deactivation of the LP-WUS, the UE may deactivate LP-WUS reception.

According to some implementations of the present disclosure, the UE may perform an LP-WUR/LP-WUS reception operation based on a PEI and paging reception configuration in order to save the power of the UE.

Figure 16:
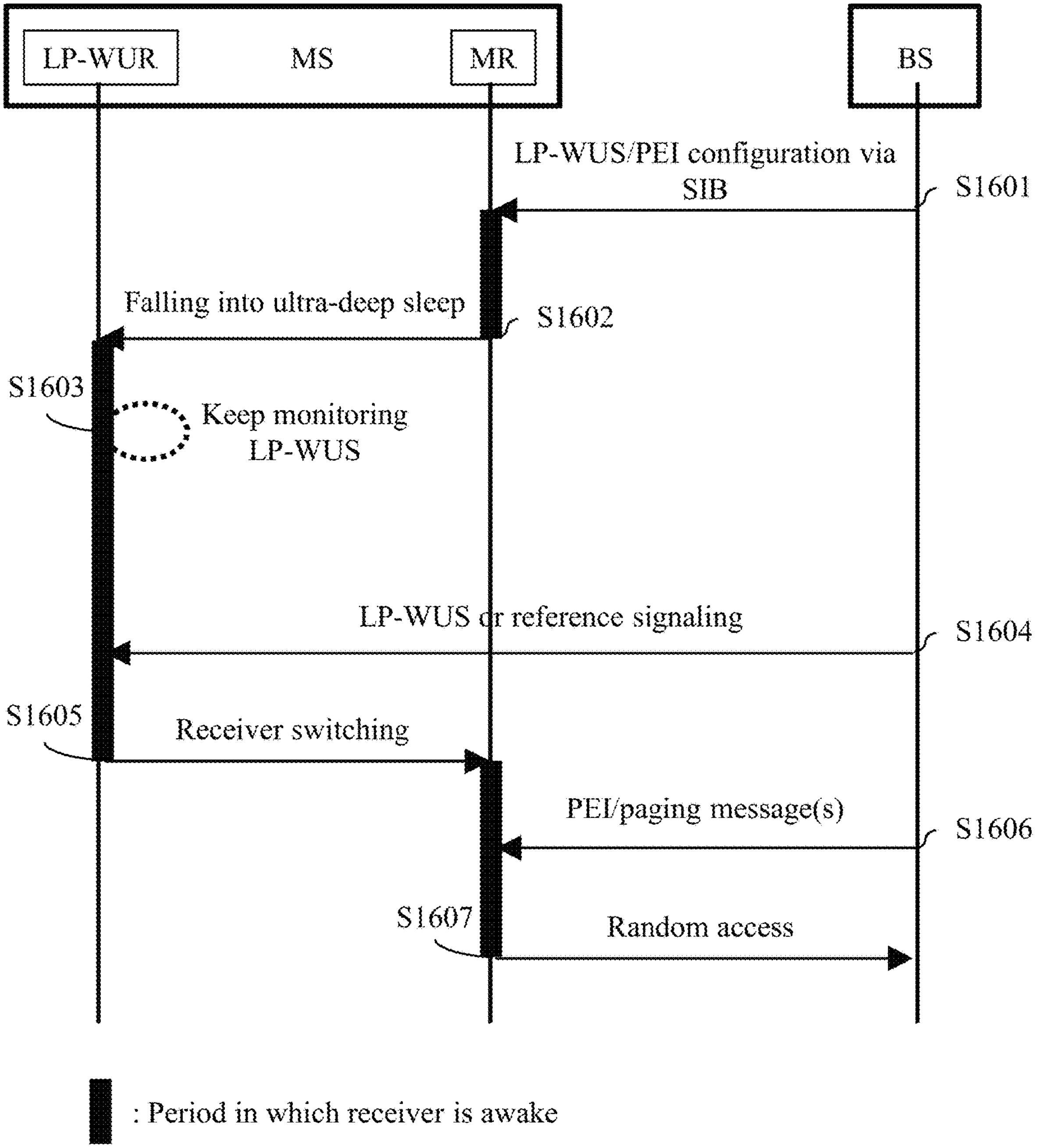
FIG. 16 illustrates a signal transmission/reception flow between a UE and a BS according to some implementations of the present disclosure.

FIG. 16 illustrates a signal transmission/reception flow between a UE and a BS according to some implementations of the present disclosure. Specifically, FIG. 16 schematically illustrates an LP-WUS reception operation of the UE using an LR, a PEI/paging reception operation using an MR, and a switching operation between two receiver types.

The UE may receive a PEI/paging/LP-WUS configuration provided by the BS (S1601). Based on the received information, the UE transitions to a sleep state through the MR (also called an MR receiver) (S1602) and attempts to receive an LP-WUS through the LR (S1603). Upon receiving the LP-WUS transmitted by the BS through the LR (S1604), the UE may perform receiver switching (S1605) and then receive a PEI or a paging signal through the MR (S1606). Upon successfully receiving the PEI and/or the paging signal of the BS, the UE may attempt to perform random access and make a request for an RRC connection to the BS (e.g., transmit an RRC setup message to the BS through a random access procedure).

Some of the above-described implementations/methods may be selectively applied. Alternatively, each of the above-described implementations/methods may operate in an independent form without any separate combination with other implementations/methods or may be operated in a linked form by combining one or more implementations/methods. Some terms, symbols, sequences, etc. used in the present disclosure may be replaced with other terms, symbols, sequences, etc.

For convenience of description, while some implementations of the present disclosure have described RRM measurement using the LP-WUR and MR of the UE and/or the UE operation of receiving the LP-WUS as an example, the implementations/methods of the present disclosure are not limited to a specific UE operation unless stated otherwise. Accordingly, some implementations/methods of the present specification may also be applied to other RRM measurements and/or LP-WUS transmission/reception operations even without separate explanation.

According to some implementations of the present disclosure, the UE may perform an LP-WUS reception operation based on the PEI configuration and/or paging configuration provided to the UE. For example, the UE may selectively perform PEI reception or attempt to perform random access after receiving the LP-WUS and dynamically switch between LP-WUS and PEI/paging reception operations considering an LP-WUS reception capability and a channel status of the UE. Therethrough, the UE may always receive the WUS with high reliability regardless of the channel status of the LP-WUS. A simulation result shows that using LP-WUS may reduce power consumption compared to leaving MR in a sleep state for a long time even if LR is always turned on, regardless of a transmission periodicity of the LP-WUS. Therefore, according to some implementations of the present disclosure, UE capability of the LP-WUS may be maximized and power consumption may be minimized through the UE operation of receiving the PEI/paging after receiving the LP-WUS. According to some implementations of the present disclosure, signaling overhead may be reduced because a PO is determined based on the LP-WUS. According to some implementations of the present disclosure, the network does not need to consider all UEs connected to the network and UE(s) are quickly paged by shortening a PO cycle in consideration of only UE(s) associated with the LP-WUS.

Figure 17:
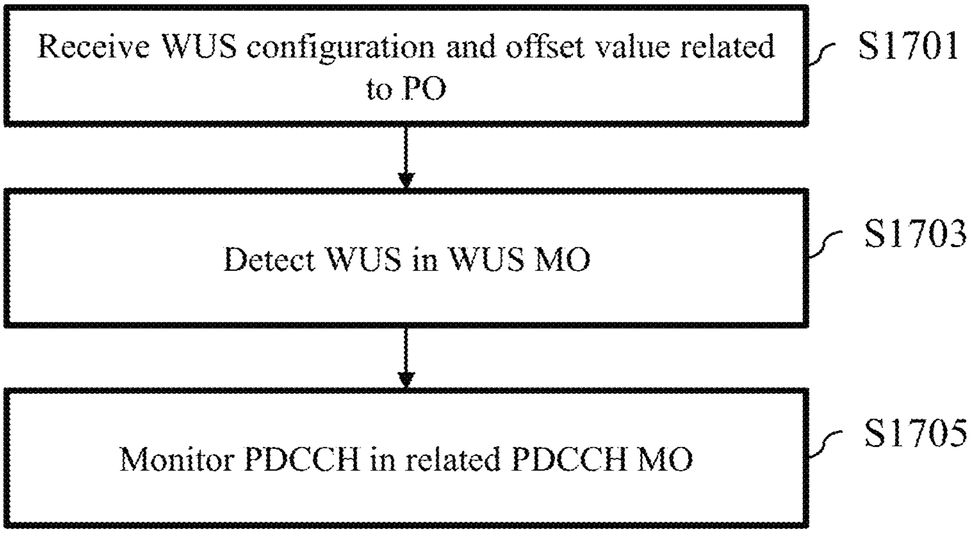
FIG. 17 illustrates the flow of a UE operation to which some implementations of the present disclosure is applicable.

FIG. 17 illustrates the flow of a UE operation to which some implementations of the present disclosure is applicable.

The UE may perform operations according to some implementations of the present disclosure in association with DL signal receptions. The UE may include at least one transceiver; at least one processor; and at least one computer memory operably connectable to the at least one processor and storing instructions that, when executed, cause the at least one processor to perform operations according to some implementations of the present disclosure. A processing device for a UE may include at least one processor; and at least one computer memory operably connectable to the at least one processor and storing instructions that, when executed, cause the at least one processor to perform operations according to some implementations of the present disclosure. A computer readable (non-transitory) storage medium may store at least one computer program including instructions that, when executed by at least one processor, cause the at least one processor to perform operations according to some implementations of the present disclosure. A computer program or a computer program product may include instructions recorded in at least one computer readable (non-transitory) storage medium and causing, when executed, (at least one processor) to perform operations according to some implementations of the present disclosure.

Referring to FIG. 17, the method by the UE, or the operations in the UE, the processing device, the computer-readable (non-transitory) storage medium, and/or the computer program product may include: receiving a WUS configuration related to WUS reception and an offset value related to a PO (S1701); based on detection of a WUS in a WUS MO based on the WUS configuration (S1703), monitoring a PDCCH for a P-RNTI in first type paging PDCCH MOs which are after the WUS MO (S1705); detecting the PDCCH having a CRC scrambled with the P-RNTI based on monitoring of the PDCCH; and acquiring a paging message based on the PDCCH. The first type paging PDCCH MOs may be respectively determined by WUS MOs based on the WUS configuration and by the offset value.

In some implementations, the method or the operations may include, based on failure of detection of the WUS in the WUS MO, omitting monitoring of the PDCCH for the P-RNTI in the first type paging PDCCH MO determined by the WUS MO and the offset value; and monitoring the WUS in a next WUS MO of the WUS MO in which detection of the WUS fails.

In some implementations, the WUS may include a UE-related ID, a cell ID, or a tracking area ID.

In some implementations, the method or operations may include, based on the WUS including a UE-related ID, deriving an additional ID based on a slot index of a slot in which the WUS is detected and on a predetermined value N.

In some implementations, the additional ID may be a UE ID, UE group ID, or UE subgroup ID.

In some implementations, the WUS may include a system information change, tracking area information, or radio access network (RAN) area information instead of the UE-related ID.

In some implementations the method or operations may include: receiving a paging search space configuration; and determining second type paging PDCCH MOs based on the paging search space configuration. The first type paging PDCCH MOs may be distinguished from the second type paging PDCCH MOs.

In some implementations, a DCI format for the first type paging PDCCH MOs and a DCI format for the second type paging PDCCH MOs may be different.

In some implementations, the method or operations may include: assuming a paging PDCCH MO of a predetermined type based on overlap between the first type paging PDCCH MOs and the second type paging PDCCH MOs.

In some implementations, the P-RNTI for the first type paging PDCCH MOs and a P-RNTI for the second type paging PDCCH MOs may be different.

Figure 18:
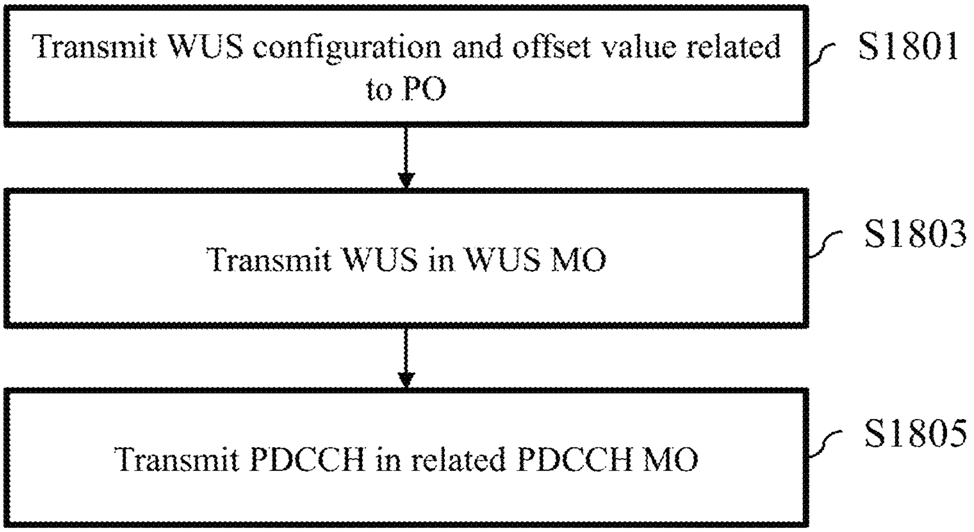
FIG. 18 illustrates the flow of a BS operation to which some implementations of the present disclosure is applicable.

FIG. 18 illustrates the flow of a BS operation to which some implementations of the present disclosure is applicable.

The BS may perform operations according to some implementations of the present disclosure in association with DL signal transmissions. The BS may include at least one transceiver; at least one processor; and at least one computer memory operably connectable to the at least one processor and storing instructions that, when executed, cause the at least one processor to perform operations according to some implementations of the present disclosure. A processing device for a BS may include at least one processor; and at least one computer memory operably connectable to the at least one processor and storing instructions that, when executed, cause the at least one processor to perform operations according to some implementations of the present disclosure. A computer readable (non-transitory) storage medium may store at least one computer program including instructions that, when executed by at least one processor, cause the at least one processor to perform operations according to some implementations of the present disclosure. A computer program or a computer program product may include instructions recorded in at least one computer readable (non-transitory) storage medium and causing, when executed, (at least one processor) to perform operations according to some implementations of the present disclosure.

Referring to FIG. 18, the method by the BS, or the operations in the BS, the processing device, the computer-readable (non-transitory) storage medium, and/or the computer program product may include: transmitting a WUS configuration related to WUS transmission; transmitting an offset value related to a PO; transmitting a PDCCH having a CRC scrambled with a P-RNTI in first type paging PDCCH MOs which are after a WUS MO, based on transmission of a WUS in the WUS MO based on the WUS configuration; and transmitting a paging message based on the PDCCH. The first type paging PDCCH MOs may be respectively determined by WUS MOs based on the WUS configuration and by the offset value.

In some implementations, based on non-transmission of the WUS in the WUS MO, the operations may include skipping, to the UE, transmission of the PDCCH having the CRC scrambled with the P-RNTI in the first type paging PDCCH MO determined by the WUS MO and the offset value; and transmitting the WUS in a next WUS MO of the WUS MO in which transmission of the WUS is skipped.

In some implementations, in the method or operations, the WUS may include a UE-related ID, a cell ID, or a tracking area ID.

In some implementations, the WUS may include a UE-related ID associated with an additional ID based on a slot index of a slot in which the WUS is detected and on a predetermined value N.

In some implementations, the additional ID may be a UE ID, a UE group ID, or a UE subgroup ID.

In some implementations, the WUS may include a system information change, tracking area information, or an RAN area information, instead of the UE-related ID.

In some implementations, the method or the operations may include: transmitting a paging search space configuration; and determining second type paging PDCCH MOs based on the paging search space configuration. The first type paging PDCCH MOs may be distinguished from the second type paging PDCCH MOs.

In some implementations, a DCI format for the first type paging PDCCH MOs and a DCI format for the second type paging PDCCH MOs may be different.

In some implementations, the method or operations may include assuming a paging PDCCH MO of a predetermined type based on overlap between the first type paging PDCCH MOs and the second type paging PDCCH MOs.

In some implementations, the P-RNTI for the first type paging PDCCH MOs and a P-RNTI for the second type paging PDCCH MOs may be different.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

The invention claimed is:

1. A method by a user equipment (UE), the method comprising:

receiving a wake-up signal (WUS) configuration related to WUS reception;

receiving an offset value related to a paging occasion (PO);

performing physical downlink control channel (PDCCH) monitoring for a paging radio network temporary identity (P-RNTI) in first type paging PDCCH monitoring occasions (MOs) which are after a WUS MO, based on detection of a WUS in the WUS MO based on the WUS configuration;

detecting a PDCCH having a cyclic redundancy check (CRC) scrambled with the P-RNTI based on the PDCCH monitoring for the P-RNTI; and acquiring a paging message based on the PDCCH, wherein the first type paging PDCCH MOs are respectively determined by WUS MOs based on the WUS configuration and by the offset value, and wherein, based on failure of detection of the WUS in the WUS MO, the PDCCH monitoring for the P-RNTI is omitted in a first type paging PDCCH MO determined by the WUS MO and the offset value, and the WUS is monitored in a next WUS MO of the WUS MO in which detection of the WUS fails.

2. The method of claim 1, wherein the WUS includes a UE-related identity (ID), a cell ID, or a tracking area ID.

3. The method of claim 1, further comprising:

based on the WUS including a UE-related identity (ID), deriving an additional ID based on a slot index of a slot in which the WUS is detected and on a predetermined value N.

4. The method of claim 3, wherein the additional ID is a UE ID, a UE group ID, or a UE subgroup ID.

5. The method of claim 3, wherein the WUS includes a system information change, tracking area information, or radio access network (RAN) area information, instead of the UE-related ID.

6. The method of claim 1, further comprising:

receiving a paging search space configuration; and determining second type paging PDCCH MOs based on the paging search space configuration, wherein the first type paging PDCCH MOs are distinguished from the second type paging PDCCH MOs.

7. The method of claim 6, wherein a downlink control information (DCI) format for the first type paging PDCCH MOs and a DCI format for the second type paging PDCCH MOs are different.

8. The method of claim 6, further comprising:

assuming a paging PDCCH MO of a predetermined type based on overlap between the first type paging PDCCH MOs and the second type paging PDCCH MOs.

9. The method of claim 6, wherein the P-RNTI for the first type paging PDCCH MOs and a P-RNTI for the second type paging PDCCH MOs are different.

10. A user equipment (UE) comprising:

at least one transceiver;

at least one processor; and at least one computer memory operably connectable to the at least one processor and storing instructions that, when executed, cause the at least one processor to perform operations comprising:

receiving a wake-up signal (WUS) configuration related to WUS reception;

receiving an offset value related to a paging occasion (PO);

performing physical downlink control channel (PDCCH) monitoring for a paging radio network temporary identity (P-RNTI) in first type paging PDCCH monitoring occasions (MOs) which are after a WUS MO, based on detection of a WUS in the WUS MO based on the WUS configuration;

detecting a PDCCH having a cyclic redundancy check (CRC) scrambled with the P-RNTI based on the PDCCH monitoring for the P-RNTI; and acquiring a paging message based on the PDCCH, wherein the first type paging PDCCH MOs are respectively determined by WUS MOs based on the WUS configuration and by the offset value, and wherein, based on failure of detection of the WUS in the WUS MO, the PDCCH monitoring for the P-RNTI is omitted in a first type paging PDCCH MO determined by the WUS MO and the offset value, and the WUS is monitored in a next WUS MO of the WUS MO in which detection of the WUS fails.

11. A base station (BS) comprising:

at least one transceiver;

at least one processor; and at least one computer memory operably connectable to the at least one processor and storing instructions that, when executed, cause the at least one processor to perform operations comprising:

transmitting a wake-up signal (WUS) configuration related to WUS transmission;

transmitting an offset value related to a paging occasion (PO);

transmitting a physical downlink control channel (PDCCH) having a cyclic redundancy check (CRC) scrambled with a paging radio network temporary identity (P-RNTI) in first type paging PDCCH monitoring occasions (MOs) which are after a WUS MO, based on transmission of a WUS in the WUS MO based on the WUS configuration; and transmitting a paging message based on the PDCCH, wherein the first type paging PDCCH MOs are respectively determined by WUS MOs based on the WUS configuration and by the offset value, and wherein, based on the WUS being not transmitted in the WUS MO, transmission of the PDCCH having the CRC scrambled with the P-RNTI is skipped in a first type paging PDCCH MO determined by the WUS MO and the offset value, and the WUS is transmitted in a next WUS MO of the WUS MO in which the WUS is not transmitted.

12. The BS of claim 11, wherein the WUS includes a UE-related identity (ID), a cell ID, or a tracking area ID.

13. The BS of claim 12, wherein the WUS includes a system information change, tracking area information, or radio access network (RAN) area information, instead of the UE-related ID.

14. The BS of claim 11, wherein the WUS includes a UE-related identity (ID) associated with an additional ID based on a slot index of a slot in which the WUS is transmitted and on a predetermined value N.

15. The BS of claim 11, wherein the operations further comprise:

transmitting a paging search space configuration; and determining second type paging PDCCH MOs based on the paging search space configuration, wherein the first type paging PDCCH MOs are distinguished from the second type paging PDCCH MOs.

16. The BS of claim 15, wherein a downlink control information (DCI) format for the first type paging PDCCH MOs and a DCI format for the second type paging PDCCH MOs are different.

17. The BS of claim 15, wherein the operations further comprise:

assuming a paging PDCCH MO of a predetermined type based on overlap between the first type paging PDCCH MOs and the second type paging PDCCH MOs.

18. The BS of claim 15, wherein the P-RNTI for the first type paging PDCCH MOs and a P-RNTI for the second type paging PDCCH MOs are different.

* * * * *